United States Patent
Miller et al.

(10) Patent No.: US 6,393,428 B1
(45) Date of Patent: May 21, 2002

(54) NATURAL LANGUAGE INFORMATION RETRIEVAL SYSTEM

(75) Inventors: John W. Miller, Kirkland; Lenox H. Brassell, Seattle, both of WA (US)

(73) Assignee: Microsoft Corporation, Redmond, WA (US)

( * ) Notice: Subject to any disclaimer, the term of this patent is extended or adjusted under 35 U.S.C. 154(b) by 0 days.

(21) Appl. No.: 09/114,786

(22) Filed: Jul. 13, 1998

(51) Int. Cl.[7] .............................................. G06F 7/00
(52) U.S. Cl. ...................................................... 707/102
(58) Field of Search ........................... 706/55; 707/3–6, 707/102

(56) References Cited

U.S. PATENT DOCUMENTS 5,418,948 A * 5/1995 Turtle .......................... 395/600
5,974,455 A * 10/1999 Monier ........................ 709/223

OTHER PUBLICATIONS

Kohl, J., "Go inside, Encarta Reference Suite 99," downloaded from http://goinside.com/98/10/ers99.html, 19 pages (Oct. 9, 1998).

Microsoft Encarta '95 The Complete Interactive Multimedia Encyclopedia, copyright 1992–1994. (CDROM).

08–97: New Captioning Technology Announced. Microsoft plans to use captioned technology in future media products, including Encarta 98. Located on a MSLibrary web page: http://mslibrary/news/elecpub/DOMIS/update/1997/08aug/ncta.htm.

10–98: New Encarta Products in Stores. List of Microsoft's entry into the encyclopedia space. Located on a MSLibrary web page: http://mslibrary/news/elecpub/DOMIS/update/1998/10oct./1098nepis.htm.

MS Encarta 98 Reference Suite Fits Five CDs on a Single DVD, By: John R. Quain, Computer Shopper, Jul. 1998 Found at: www.zdnet.com/products/content/cshp/1807/318632.html.

PC Update Online. Microsoft Encarta 98 Encyclopaedia Deluxe Edition by: Ash Nallawalla. Found at: www.melbpc.org.au/pcupdate/9712/9712article9.htm.

Morris, Robert, "Scatter Storage Techniques," *Communications of the ACM*, vol. 11, No. 1, Jan. 1968, pp. 38–44.

Adler et al., "PNG (Portable Network Graphics) Specification," Version 1.0, found on the World Wide Web at http://www.w3.org/TR/REC–png. Copyright©1996 by Massachusetts Institute of Technology, pp. 1–44.

Pham et al., "Threads in Distributed Applications," *Multithreaded Programming with Windows NT*, Chapter 9, ©1996, published by Prentice Hall, pp. 186–190.

* cited by examiner

*Primary Examiner*—John A. Follansbee
(74) *Attorney, Agent, or Firm*—Joseph R. Kelly; Westman, Champlin & Kelly, P.A.

(57) ABSTRACT

A natural language information retrieval (NLIR) system employing a hash table technique to reduce memory requirements and a proxy process module to improve processing speed on multi-processor platforms. The NLIR system includes a Dynamic Link Library (DLL) search engine annex that implements a number of improvements that allow the preexisting natural language processing (NLP) core code module to operate sufficiently fast in a limited-memory environment. The improvements relate to (1) reducing storage requirements, (2) increasing processing speed, (3) improved operation on multi-processor platforms, and (4) a trouble-shooting mechanism. The NLIR system includes three modes of operation. First, during index processing, the NLIR system prepares documents for NLP searching to create a group of searchable documents. Second, during question processing, the NLIR system receives a natural language question and, for each document in the group of searchable documents, computes a document score connoting the likelihood that the document includes an answer to the natural language question. Third, during debugging, the NLIR system receives trouble-shooting requests and returns diagnostic reports, such as a document trace report and a question trace report.

26 Claims, 9 Drawing Sheets

NATURAL LANGUAGE INFORMATION RETRIEVAL SYSTEM

TECHNICAL FIELD

This invention relates generally to the field of computer software and, more particularly, to a natural language information retrieval system employing a hash table technique to reduce memory requirements, a proxy process module to improve processing speed on multi-processor computing platforms, and a debugging module that is not shipped along with the natural language information retrieval system.

BACKGROUND OF THE INVENTION

The number and size of electronic documents increases continually. Any computer user with access to the Internet can search a vast universe of documents addressing every conceivable topic. Computer users may also search many other sources of electronic documents, such as dial-in databases, CD-ROM libraries, files stored on hard drives, files stored on tape drives, files stored on resources connected through an intranet, and the like. Although the available universe of documents may contain a wealth of information on a wide variety of subjects, searching through this universe to identify a small subset of documents that are relevant to a specific inquiry can be a daunting task. In fact, finding a large supply of searchable electronic documents may often be a far easier task than searching the individual documents to find information that is germane to a particular inquiry.

As a result, computer users have a continuing need for effective tools for searching the large and increasing supply of electronic documents. For example, key-word text search engines allow a computer user to identify documents that contain selected key words. More advanced search engines allow the user to further refine search requests using Boolean logic by limiting the number of words between key words, automatically searching for variations of key words, specifying searches using Boolean logical operations, and so forth. These conventional key-word text search engines have limited utility, however, because simply searching for the presence of key words using Boolean logical operations often identifies a large number of candidate documents. The user must then examine each candidate document to identify those that are actually germane to the user's inquiry. This type of document-by-document examination can be tedious and time consuming.

Natural language information retrieval (NLIR) systems have been developed to improve over Boolean-logic keyword search engines. Rather than requiring a Boolean keyword search definition, an NLIR system accepts a natural language or "plain English" question. The NLIR system automatically identifies key words in the question and important semantic relationships between the key words. For example, the NLIR system may analyze the question and identify semantic relationships within the question, such as a verb and the subject and/or object of that verb. The NLIR system then searches the universe of documents to identify those documents in which the same key words appear in the same semantic relationships.

These semantic relationships are typically identified by breaking sentences down into semantic relationships, such as logical-form triples (LFTs). An LFT includes two words from a sentence and a qualifier representing the semantic relationship between the words. For example, a user may enter the natural language question, "Do elephants have tusks?" For this question, the noun "elephant" is in a deep subject relationship (qualifier "Dsub") with the verb "have," and the noun "tusks" is in a deep object relationship (qualifier "Dobj") with the verb "have." Thus, the question "Do elephants have tusks?" can be broken down into two LFTs, "elephant-Dsub-have" and "tusk-Dobj-have."

The NLIR system then searches the universe of documents for files containing the same LFTs. For example, the sentence, "African elephants, which have been hunted for decades, have large tusks," also includes the LFTs, elephant-Dsub-have" and "tusk-Dobj-have." Thus, the NLIR system would identify a document containing this sentence as a document having a high likelihood of containing an answer to the natural language question, "Do elephants have tusks?" This type of semantic-qualified searching can greatly increase the quality of information retrieval. In other words, NLIR techniques can greatly increase the likelihood that a search engine will identify documents that contain an answer to a specific inquiry. NLIR systems that accept natural language rather than Boolean search requests are also easier to use in many situations because computer users are often more familiar with stating inquiries in plain English, as opposed to formulating inquiries in a Boolean-logic format.

Conventional NLIR systems encounter drawbacks, however, because each document in the universe of searchable documents must be analyzed to identify the LFTs present in the document. Performing LFT analysis "on the fly" for a large universe of searchable documents would be prohibitively time consuming. Moreover, the same LFT processing would have to be performed multiple times for the same document. That is, LFTs would have to be identified for the same document for each natural language question processed in connection with that document. For this reason, LFT processing is typically performed only once for a particular document, and the LFTs present in the document are stored in association with the document. Preprocessing a document to identify LFTs and thus make the document amenable to subsequent NLIR analysis is sometimes referred to as "indexing" the document.

Indexing a large number of documents, such as all of the documents present on an electronic database or network, can be very time consuming. Fortunately, powerful techniques have been developed for handling such large-scale data processing tasks. These techniques include, among others, using multi-processor computer systems and multi-tasking operating systems that perform background processing. But conventional NLIR systems are not presently configured to take full advantage of these techniques because conventional NLIR systems rely heavily on global variables that prevent the NLIR system from running multiple processing threads simultaneously. The inability to simultaneously run multiple processing threads typically prevents the NLIR system from operating on more than one processor simultaneously, which undermines a major advantage of conducting the processing on a multi-processor computer system.

In addition, storing a complete set of LFTs for each document for a large number of documents can require a large amount of data storage space. In fact, it is not unusual for a complete set of LFTs to require as much storage space as the document itself. Thus, storing a complete set of LFTs for a large number of indexed documents may require a prohibitively large memory allocation for a storage-space limited program module, such as an electronic encyclopedia sold on CD-ROM. For example, the designers of an electronic encyclopedia program module may not be willing to reduce the number of documents by one-half in order to make the remaining documents amenable to NLIR processing. In addition, compressing the LFT data to reduce the memory requirement may result in prohibitively slow processing, as each LFT file would have to be uncompressed during question processing.

As a result, the desire to implement NLIR systems in connection with storage-space limited program modules presents a familiar conundrum in software development, in which acceptable processing speed cannot be achieved given acceptable memory requirements. Those techniques presently available for improving processing speed do so at the cost of increased memory requirements, and those techniques available for decreasing memory requirements do so at the cost of decreased processing speed (i.e., increased processing overhead). There is no solution presently available to provide the combination of acceptable processing speed and acceptable memory requirements for certain storage-space limited program modules, such as electronic encyclopedias and the like. For this reason, NLIR processing is not currently feasible in connection with these storage-space limited program modules, which includes an important class of applications sold on CD-ROM. In addition, NLIR processing is not presently feasible in relatively large-scale distributed computing environments, such as search engines used in connection with local-area networks, wide-area networks, intranets, the Internet, and so forth.

Thus, there is a need for an NLIR system exhibiting the combination of acceptable processing speed and acceptable memory requirements when implemented in connection with storage-limited program modules, such as a CD-ROM title. More specifically, there is a need for an NLIR system that does not require on-the-fly LFT processing or storage of a complete LFT listing for each document in a universe of searchable documents. There is also a need for an NLIR system for searching relatively large-scale distributed computing environments, such as search engines used in connection with local-area networks, wide-area networks, intranets, the Internet, and so forth. In addition, there is a need for an NLIR system that takes full advantage of powerful processing techniques, including multi-processor computer systems and multi-tasking operating systems.

SUMMARY OF THE INVENTION

The present invention meets the needs described above in an NLIR utility that stores LFTs using a hash-table technique that relies on a quasi-random hash value computed for each LFT. During index processing, the NLIR utility computes hash values for each LFT present in a document. The hash value is parsed into an address hash and a signature hash, and each LFT is represented by its hash signature stored in an array at a memory location based on the associated address hash. The NLIR utility uses this technique to create a hash-table fingerprint for each document in a group of searchable documents. Each fingerprint, which includes a representation of the LFTs in the corresponding document, is stored in a relatively small hash-table array.

During question processing, the NLIR utility obtains LFTs for a natural language question on the fly, and computes hash values for the question LFTs using the same formula that was used during index processing. The NLIR utility then compares the hash values for the question LFTs to the hash-table fingerprints stored for each document in the group of searchable documents. A match between a hash value for a question LFT and a hash value found in a searched fingerprint indicates a very high likelihood that the corresponding document contains an LFT matching the question LFT. The NLIR utility assigns a predefined score to each matching LFT based on the type of LFT, and sums the scores to produce a document score for each document. The NLIR utility returns the document scores to a search engine, which displays the documents in a priory order based on the document scores returned by the NLIR utility.

Thus, during index processing, the NLIR utility preprocess the group of searchable documents to create a hash-table fingerprint for each document without having to store the actual LFTs for each document. Then, during question processing, the NLIR utility performs LFT comparisons directly on the hash-table fingerprints without having to generate the actual LFTs for the searched documents. This use of hash tables gives the NLIR utility the combination of acceptable processing speed and acceptable memory requirements when implemented in connection with a storage-limited program module, such as a CD-ROM title. That is, the NLIR utility does not require on-the-fly LFT processing or storage of a complete LFT listing for each document searched. The resulting NLIR utility may also be used in connection with engines for searching relatively large-scale distributed computing environments, such as search engines used in connection with local-area networks, wide-area networks, intranets, the Internet, and so forth.

To obtain LFTs for a document or for a natural language question, one or more sentences defining LFT queries are passed to a conventional natural language processing (NLP) core code module, which is also referred to as the "base technology." The invention may also include a proxy process module that creates a new process for each client thread that calls the NLIR utility except the first such active thread. In other words, the proxy process module creates a new process for each thread that calls the NLIR utility while the NLP core code module is already processing an active thread. These new processes take single sentences as input and pass them one at a time to the NLP core code module for LFT generation. Because each concurrent LFT query occurs in the context of a separate process, the "non-thread safe" base technology code can run on multiple processors simultaneously.

The invention may also include a debugging module that typically is not shipped to customers on the same CD-ROM as the NLIR module. Although they are not typically shipped together, the debugging module can activate and deactivate a trace document function that resides within the NLIR module. When the trace document function is active, the NLIR module produces a diagnostic report known as a "document trace" for each document processed by the NLIR system. The debugging module can also activate and deactivate a trace question function that resides within the NLIR module. When the trace question function is active, the NLIR module produces a diagnostic report known as a "question trace" for each question processed by the NLIR system. The document trace lists the LFTs created for a corresponding document, and the question trace lists the LFTs created for a corresponding question. Programmers can therefore use the debugging module to inspect the LFT contents of questions and documents without having to allocate space for the debugging module on the CD-ROM containing the NLIR module. The debugging module may assist programmers in analyzing and debugging the NLIR module and the base technology code.

Generally described, the invention includes a client program module, such as a natural language information retrieval module. The invention also includes a utility module, such as a natural language processing core code module, that is configured to provide service functions in response to commands from the client program module. The invention also includes a proxy process module configured for receiving the commands from one or more active client threads associated with the client program module, creating processes for one or more of the active client threads, and passing the command received from each active client thread to utility module in the context of an associated process. For example, the proxy process module may be configured to receive the commands from one or more active client threads other than the first active client thread, create a process for each client thread other than the first active client thread, and pass the commands received from each active client thread other than the first active client thread to the utility module in the context of an associated process.

The client program module may be stored on a first discrete storage medium, and the invention may include a debugging program module stored on a second discrete storage medium. The debugging program module may include a first interface method for activating a first diagnostic function that, when active, causes the client program to produce a first diagnostic report. The debugging program module may also include a second diagnostic function that, when active, causes the client program to produce a second diagnostic report.

More specifically, the invention provides an NLIR utility configured to implement a method for creating a group of searchable documents, which is also referred to as "index processing." For each document, the NLIR utility receives text defining the document and parses the text into a plurality of text portions, such as sentences. The NLIR utility obtains one or more logical form relationships corresponding to each text portion, typically by passing the text portion to a conventional NLP core code module. Once logical form relationships have been obtained for the entire document, the NLIR utility defines an array having a size corresponding to the number of logical form relationships for the document. The NLIR utility then creates a hash-table fingerprint for the document by computing a hash value for each logical form relationship. For each hash value, the NLIR utility obtains an address hash and a signature hash based on the corresponding hash value and stores the signature hash in the array at a memory location corresponding to the address hash.

The NLIR utility may parse each hash value to obtain the corresponding address hash and signature hash. The NLIR utility may also identify an array index for an array entry point corresponding to the address hash. If the array entry point is empty, the NLIR utility may store the signature hash at the array entry point. Alternatively, if the array entry point is not empty, the NLIR utility may increment the array index of the array entry point until an empty memory location is defined and store the signature hash at the empty memory location.

More specifically, the NLIR utility may set the array index for the array entry point to the remainder of the address hash divided by the size of the array. In addition, the NLIR utility may set the size of the array to a predetermined percentage larger than the number of logical form relationships for the document. For example, the predetermined percentage may be 110%, the hash value may be a 32-bit value, the address hash may be the upper 16 bits of the hash value, and the signature hash may be the lower 16 bits of the hash value.

The NLIR utility is also configured to respond to a natural language question, which is also referred to as "question processing." During question processing, the NLIR utility receives a natural language question and obtains one or more logical form relationships for the question, typically by passing the question to the NLP core code module. Upon obtaining the question logical form relationships, the NLIR utility computes a hash value corresponding to each logical form relationship for the question. Then, for one or more document in the group of searchable documents, the NLIR utility compares the hash values corresponding to the logical form relationships for the question to, the hash-table fingerprint for the document, and identifies one or more matching hash values.

The NLIR utility may also obtain a score for each matching hash value and, in response, sums the scores to compute a document score for each document connoting the likelihood that the document contains an answer to the natural language. The NLIR utility may then pass the document scores to a search engine that ranks the documents in order of their respective document scores. The search engine can display a list of highest-ranking documents as a suggestion list of documents that likely contain an answer to the natural language question.

During question processing, the NLIR utility may parse a current hash value into a current address hash and a current signature hash. Parsing the hash value means that the NLIR utility may utilize a first subset of the hash value and the address hash a second subset of the hash value as the signature hash. These subsets may or may not overlap, and may or may not contain all of the digits of the hash value. The NLIR utility may then identify an array entry point in the array corresponding to the current address hash. If the array entry point is not empty, the NLIR utility may identify one or more consecutively-addressed data-containing memory locations beginning with the array entry point.

The NLIR utility then compares the current signature hash to the data value stored at each of the consecutively-addressed data-containing memory locations. If the current signature hash matches the data value stored in any of the consecutively-addressed data-containing memory locations, the NLIR utility identifies the current hash value as a matching hash value. Alternatively, if the array entry point is empty, the NLIR utility may identify the current hash value as a non-matching hash value. In addition, if the current signature hash does not match the data value stored at any of the consecutively-addressed data-containing memory locations, the NLIR utility may identify the current hash value as a non-matching hash value.

The invention also provides an NLIR system that includes an NLIR module configured for creating a group of searchable documents. For each document, the NLIR module receives text defining the document from a search engine and returns a hash-table fingerprint including a representation of logical form relationships for the document to the search engine. In addition, for each document, the NLIR module receives a natural language question and the hash-table fingerprint for the document from the search engine. In response, the NLIR module returns a document score to the search engine connoting the likelihood that the document contains an answer to the natural language question. The NLIR system may also include a search engine configured for ranking the documents in order of their respective document scores. The search engine may also display a list of highest-ranking documents as a suggestion list of documents containing an answer to the natural language question.

According to an aspect of the invention, the NLIR module defines an interface including a first interface method for receiving the text documents from the search engine and returning the hash-table fingerprints to the search engine.

The interface defined by the NLIR module also includes a second interface method for receiving a current natural language question and a hash-table fingerprint for a current document from the search engine, and returning a document score to the search engine connoting the likelihood that the current document contains an answer to the natural language question. The interface defined by the NLIR module may also include a third interface method for initiating processing of the natural language question, and a fourth interface method for terminating processing of the natural language question.

According to another aspect of the invention, the NLIR module parses each document into a plurality of sentences and passes each sentence to the NLP core code module. For threads other than the first active thread to pass a sentence to the NLP core code module, the NLIR module passes the sentence to the NLP core code module by way of a proxy process module. This proxy process module creates a process for each NLIR client thread except the first such thread. The proxy process module passes one sentence at a time to the NLP core code module, which identifies one or more logical form relationships corresponding to each sentence and returns the logical form relationships to the NLIR module.

According to yet another aspect of the invention, the NLIR system includes a debugging module that defines an interface that includes a first interface method for activating and deactivating a trace document function that, when active, causes the NLIR system to identify the logical form relationships identified for document text processed by the NLIR system. The interface defined by the debugging module also includes a second interface method for activating and deactivating a trace question function that, when active, causes the NLIR system to identify the logical form relationships identified for questions processed by the NLIR system.

That the invention improves over the drawbacks of prior natural language information retrieval systems and how it accomplishes the advantages described above will become apparent from the following detailed description of the exemplary embodiments and the appended drawings and claims.

DETAILED DESCRIPTION OF EXEMPLARY EMBODIMENTS

Figure 1:
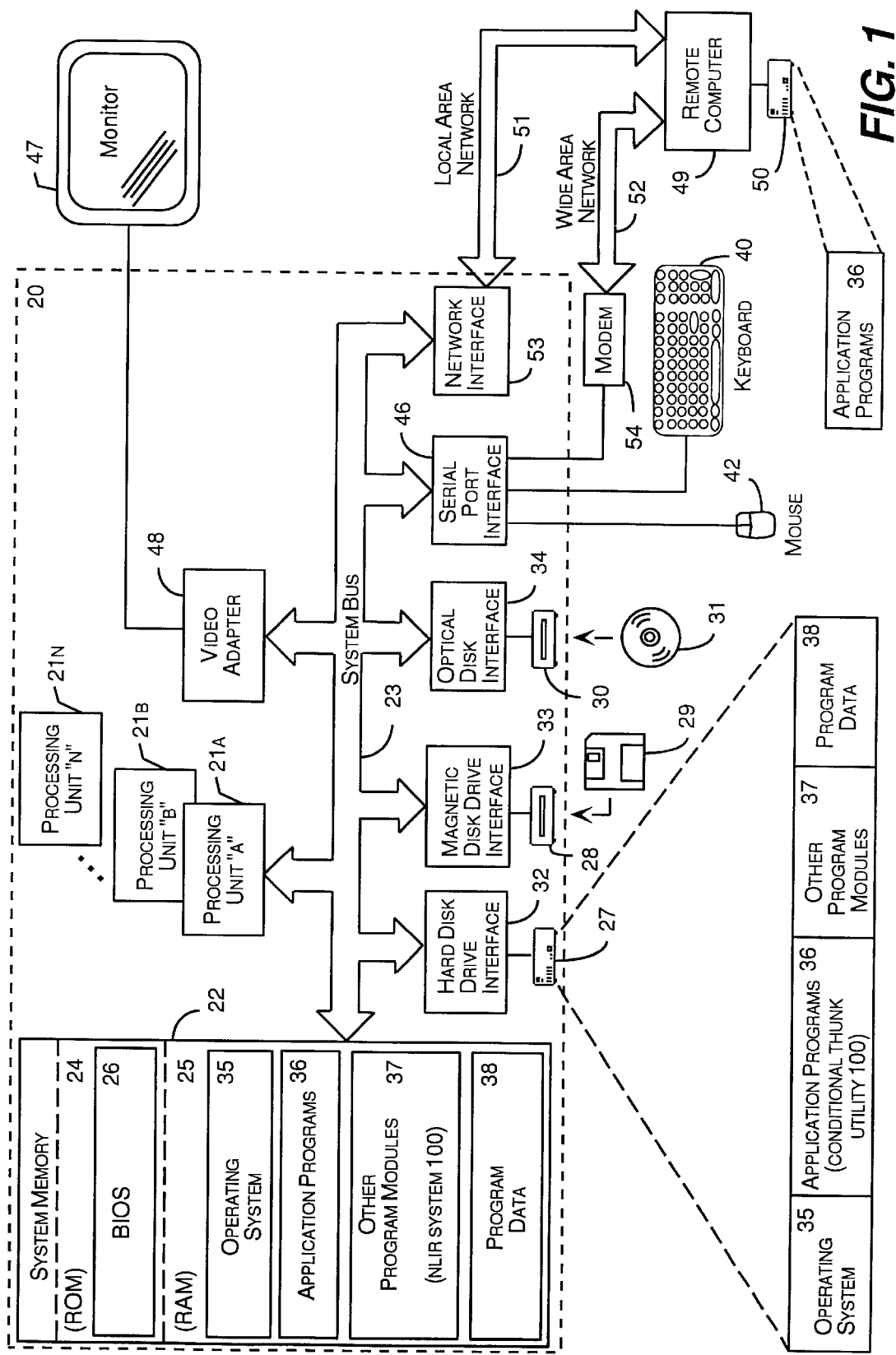
FIG. 1 is a functional block diagram of a personal computer system that provides the operating environment for the exemplary embodiments of the invention, which are shown in FIGS. 2 through 9.

The invention may be implemented as an NLIR system including a Dynamic Link Library (DLL) search engine annex that implements a number of improvements that allow the preexisting NLP core code module (the base technology) to operate sufficiently fast in a limited-memory environment, such as the ENCARTA '99 program sold on CD-ROM. The improvements relate to (1) reducing storage requirements, (2) increasing processing speed, (3) improved operation on multi-processor platforms, and (4) a trouble-shooting mechanism. The NLIR system typically includes three modes of operation. First, during index processing, the NLIR system prepares documents for NLP searching to create a group of searchable documents. Second, during question processing, the NLIR system receives a natural language question and, for one or more documents in the group of searchable documents, computes a document score connoting the likelihood that the document includes an answer to the natural language question. Third, during debugging, the NLIR system receives trouble-shooting requests and returns diagnostic reports, such as a document trace report and a question trace report.

The NLIR system typically includes an NLIR utility, a search engine, and a group of searchable documents. The NLIR utility includes a pre-existing NLP core code module, an example of which is described in the commonly-owned U.S. patent applications, Ser. No. 08/674,610, entitled "Method And System For Computing Semantic Logical Forms From Syntax Trees," filed on Jun. 28, 1996, now U.S. Pat. No. 5,966,686; Ser. No. 08/898,652, entitled "Apparatus and Methods for an Information Retrieval System that Employs Natural Language Processing of search Results to Improve Overall Precision," filed on Jul. 22, 1997, now U.S. Pat. No. 5,933,822; and Ser. No. 09/097,979, entitled "System for Filtering Documents in Information Retrieval Using Natural Language Processing Techniques," filed on Jun. 16, 1998, which are each incorporated into this specification by reference.

In addition to the NLP core code module, an exemplary NLIR utility includes three elements, an NLIR module (NLIR.DLL), a debugging module (NLIRDUMP.DLL), and a proxy process module (NLIRSRV.EXE). The NLIR module and the debugging module expose application program interfaces (APIs) that are used to integrate the modules into an object-oriented computer software system. As noted above, the NLIR utility typically interfaces with a preexisting search engine. Although the search engine may be a preexisting program module, it may be enhanced to cooperate with the NLIR utility, for example by ranking candidate documents according to the document scores assigned by the NLIR utility and displaying the ranked list on a display device.

The NLP core code module identifies logical form relationships for a given segment of text. For example, NLP core code module referenced above identifies logical-form triplets (LFTs) for a given sentence. Each LFT includes two words and a qualifier representing the semantic relationship between the words. Basically, documents are identified as potentially responsive to a natural language question by selecting documents that contain the same LFTs as the question. There are a number different types of LFTs that are heuristically ranked to reflect the likelihood that a matching LFT indicates a document that is responsive to the question. The following list identifies the various LFTs, their heuristic scores, and the semantic relationships that they represent. It should be understood that certain of these LFTs may be omitted from a particular embodiment, other LFTs may be added to a particular embodiment, and the heuristic score assigned to each LFT may be varied within the teaching of the present invention.

List of LFTs

1. CausBy
   Score: 100
   Relationship: "deep causative"
   Example: "The reason he came was clear."
   LFT: come; CausBy; reason
2. Dadj
   Score: 75
   Relationship: "deep predicate adjective"
   Example: "The situation is quite different in Communist countries."
   LFT: situation; Dadj; different
3. Dcmp
   Score: 100
   Relationship: "deep object complement"
   Example: "The invention of printing made prepublication censorship possible."
   LFT: make; Dcmp; possible
4. Dind
   Score: 100
   Relationship: "deep indirect object"
   Example: "He works for Nathan."
   LFT: work; Dind; Nathan
5. Dobj
   Score: 100
   Relationship: "deep direct object:
   Example: "Griffey hit a homer."
   LFT: hit; Dobj; homer
6. Duratn
   Score: 50
   Relationship: "duration; length of time"
   Example: "The hearings continued for six months."
   LFT: continue; Duratn; six_months
7. Dsub
   Score: 100
   Relationship: "deep subject"
   Example: "A second homer was hit by Griffey in the eighth inning."
   LFT: hit; Dsub; Griffey
8. LocAt
   Score: 75
   Relationship: "deep location"
   Example: "This licensing system continued in England until 1695."
   LFT: continue; LocAt; England
9. Mods
   Score: 25
   Relationship: "unspecified modifiers that are not clauses"
   Example: "In Rome, only persons in authority enjoyed the privilege of speaking freely."
   LFT.: speak; Mods; freely
10. Nadj
    Score: 25
    Relationship: "adjectives modifying a noun"
    Example: "The situation is quite different in Communist countries."
    LFT: country; Nadj; communist
11. PossBy
    Score: 25
    Relationship: "deep possessor"
    Example: "A child learns to speak the language of its environment."
    LFT: environment; PossBy; child
12. Ptcl
    Score: 10
    Relationship: "particle in two-part verbs"
    Example: "The question is whether we can figure out if there are column or row headings."
    LFT: figure; Ptcl; out
13. TmeAt
    Score: 50
    Relationship: "deep time"
    Example: "The first catalog of forbidden books was issued by Pope Gelasius in 496."
    LFT: issue; TmeAt; 496

The preexisting NLP core code module (i.e., the base technology) has a number of shortcomings including (1) the set of LFTs for a document is very large, and storing the LFTs for a large document set requires a large memory allocation; (2) literal LFT matching for a large document set is very time consuming; (3) the base technology is not "thread safe" and, thus, does not run efficiently on multiprocessor platforms; and (4) LFTs represented as "fingernails" stored as hash values cannot be directly identified, which makes LFT generation and scoring difficult to analyze after the representations of the LFTs have been stored in an associated fingernail.

The present invention solves these problems through a number of techniques. The memory storage and literal LFT matching problems are solved by storing and searching hash tables that represent the LFTs rather than the LFTs themselves. That is, each document is "indexed," which means that it is represented by a hash-table fingerprint that corresponds to the LFTs identified by the base technology for the document. The hash table is populated by using a Cyclical Redundancy Check (CRC) algorithm to compute a 32-bit CRC quasi-random hash value corresponding to the literal string forming each LFT. For example, the CRC defined by ISO 3390, which is well known to those skilled in the art, may be used to compute the hash values. The upper 16 bits of the CRC value are used to determine an "address hash" or array index number for the hash table, and the lower 19 bits are used as a "signature hash" that is stored within the array entry corresponding to the array index (the upper three bits of the signature hash overlap with the lower three bits of the address hash). This hash-table technique is particularly well suited to the natural language information retrieval application because an occasional hash-related mistake or "collision" is not catastrophic; it just results in a document having a higher score than it otherwise would have.

The number of elements in the hash table is equal to 110% times the number of LFTs in the document to provide "padding" in the table. The hash table values A(i) are initialized to zero. An array entry point (array index=i) for a particular LFT is computed as "i=hash mod (N)," which produces an address (i) between zero and N−1. Specifically, the array entry point (i) is set equal to the remainder of address hash/N. If the array entry A(i) for that address is not equal to zero (i.e., the table entry A(i) corresponding to address (i) is already occupied by a previously-assigned signature hash), then the array index is incremented. If the resulting array index is outside the array (i.e., array index= N), then the array index is set equal to zero (i.e., the address value wraps from the bottom to the top of the array). Once an array index with an empty array entry (i.e., A(i)=0) is located, the signature hash for the LFT is stored in that array entry. This process is repeated until the signature hash values for all of the LFTs are stored in the hash table.

Those skilled in the art will appreciate that incrementing the array index is a simple method for identifying additional candidate locations to store the signature hash. Other more sophisticated methods could also be used, such as adding a quasi-random number to the array entry point. For example, the quasi-random number could be based on the LFT and the number of candidate locations already considered.

To reduce the length of the searches, let K be the number of candidate locations considered by incrementing, jumping by a quasi-random number or another suitable searching method. A value K-max may set a maximum search length, such as K-max=20. Since only K-max signatures or fewer need to be examined at query time, there is a reduction in the chance of finding a matching signature which corresponds to a different LFT. If a signature cannot be stored within the K-max=20 allowed steps, then the signature can be stored in place of one of the conflicting 20 signatures already in the table. Additional passes through the LFTs can attempt to restore the removed signatures. This approach would reduce the number of candidate locations searched for each LFT without having to increase the padding factor.

During question processing, each document in the universe of indexed documents is searched using a method that analogous to the method used to store the LFT signatures. To illustrate question processing, consider the example in which alternative array candidates are identified by incrementing the array index. The base technology first computes LFTs for a natural language question. A 32-bit CRC is then computed using the same CRC algorithm that was used during index processing. The upper 16 bits of the CRC are used to determine an array index for an array entry point (i). The array entries for that array index (i) and successive non-empty array entries are checked in the fingerprint (i.e., hash table) for a particular document. If an array entry A(i) is found matching the lower 19 bits of the CRC (i.e., the signature hash for the LFT), this is considered a match for the particular LFT. If an empty data entry (i.e., A(i)=zero) is found before a match, this is considered a lack of a match for the particular LFT.

Note that the 110% "padding" limits the amount of the hash table that must be searched for each question LFT. This question-LFT matching process is repeated for each LFT in the natural language question, and the scores for the resulting LFT matches are summed to produce a document score. This process is also repeated for one or more document in the universe of indexed documents. The documents are then ranked in the order of document score and presented to the user as documents that have a high likelihood of containing an answer to the natural language question.

Representing LFTs using pseudo-random numbers stored in a hash-table will inevitably result in a certain number of "collisions" in which two different LFTs produce the same hash value. Collisions are inevitable, of course, because the number of possible 19-bit signature hash values is less than the number of possible LFTs that occur in the English language. Using the hash-table technique reduces but does not eliminate the probability of a collision. Nevertheless, the hash-table technique is advantageous in the context of an NLIR search engine because, in this context, the consequences associated with a collision are relatively minor. In particular, the only consequence associated with a collision will typically be that a particular document will receive a higher score than it would have received in the absence of the collision.

The exemplary embodiments of the present invention recognize that this type of occasional over-score is quite acceptable in the context of an NLIR system that presents a user with a ranked list of potentially-relevant documents in response to a natural language question. The occasional over-score is quite acceptable because the user can easily disregard an over-scored document if it is, in fact, not relevant to the user's inquiry. Other documents in the ranked list will, most likely, not be over-scored. Moreover, the alternatives to using a hash-table technique, such as storing a complete LFT listing for each document in the universe of searchable documents, computing LFTs on the fly for each document in the universe of searchable documents, or foregoing NLIR processing are far less attractive.

A proxy process module (NLIRSRV.EXE) is used to address the problems caused by the fact that the NLP core code module is not "thread safe." Each LFT query passed to the NLP core code module except those from the first active thread is passed to the proxy process module, which creates a new process for each NLIR client thread except the first. In other words, the proxy process module creates a new process for each thread that calls the NLIR utility while the NLP core code module is already processing an active thread. These new processes take single sentences as input and pass them one at a time to the NLP core code module for LFT generation. Because each concurrent LFT query occurs in the context of a separate process, the "non-thread safe" base technology code can run on multiple processors simultaneously. Rather than creating a new process for each new client thread, the proxy process module could alternatively be configured to create a new process for each CPU in a multi-CPU machine.

Finally, the trouble-shooting problem is addressed by providing a debugging module (NLIRDUMP.DLL) that is typically not shipped to customers. The debugging module can activate and deactivate a trace document function that resides within the NLIR module. When the trace document function is active, the NLIR module produces a document trace for each document processed. The debugging module can also activate and deactivate a trace question function that resides within the NLIR module. When the trace question function is active, the NLIR module produces a question trace for each question processed and a question trace for each question processed. The document trace lists the LFTs created for a corresponding document, and the question trace lists the LFTs created for a corresponding question. The debugging module can therefore be used by programmers to debug shipped code and inspect the LFT contents of questions and documents without having to allocate space on the shipped CD-ROM for the debugging module.

Those skilled in the art will appreciate that the specific parameters selected for the exemplary embodiment, such as the 110% padding factor used to determine the size of the hash-table array, the 32-bit size of the hash value, the 16-bit size of the address hash, and the 19-bit size of the signature hash may all be varied somewhat within the teachings of the present invention. Accordingly, the number of LFTs that may be stored in a hash-table fingerprint for a particular document may be increased or decreased by altering the number of bits in the address hash. And the likelihood of LFT "collisions" caused by different LFT producing matching hash values can be increased or decreased by altering the number of bits in the hash value.

More specifically, the particular values selected for these parameters represent trade-off balances struck between the competing goals of reducing memory requirements, increasing processing speed, and increasing searching precision. These trade-off balances may be altered somewhat in alternative embodiments of the invention, particularly in view of the trend of increasing processing speed and memory-storage capabilities prevailing in computer technology. In addition, the specific LFTs identified by the NLP core code module and the heuristic scores assigns to LFT matches may also be varied somewhat within the teaching of the present invention. Alternate embodiments of the invention may also employ techniques other than the CRC algorithm defined by ISO 3309 for computing pseudo-random numbers used as hash values, and may use logical-form relationships other than LFTs, such as logical-form relationships involving three, four, or more words in semantic constructs, Boolean logical expressions, and so forth.

Exemplary Operating Environment

FIG. 1 and the following discussion are intended to provide a brief, general description of a suitable computing environment in which the invention may be implemented. While the invention will be described in the general context of a natural language information retrieval system software program that runs on an operating system in conjunction with a personal computer, those skilled in the art will recognize that the invention also may be implemented in combination with other program modules. Generally, program modules include routines, programs, components, data structures, etc. that perform particular tasks or implement particular abstract data types. Moreover, those skilled in the art will appreciate that the invention may be practiced with other computer system configurations, including hand-held devices, multiprocessor systems, microprocessor-based or programmable consumer electronics, minicomputers, mainframe computers, and the like. The invention may also be practiced in distributed computing environments where tasks are performed by remote processing devices that are linked through a communications network. In a distributed computing environment, program modules may be located in both local and remote memory storage devices.

With reference to FIG. 1, an exemplary system for implementing the invention includes a conventional personal computer 20, including multiple processing units 21a–n, a system memory 22, and a system bus 23 that couples the system memory to the processing units 21a–n. The system memory 22 includes read only memory (ROM) 24 and random access memory (RAM) 25. A basic input/output system 26 (BIOS), containing the basic routines that help to transfer information between elements within the personal computer 20, such as during start-up, is stored in ROM 24. The personal computer 20 further includes a hard disk drive 27, a magnetic disk drive 28, e.g., to read from or write to a removable disk 29, and an optical disk drive 30, e.g., for reading a CD-ROM disk 31 or to read from or write to other optical media. The hard disk drive 27, magnetic disk drive 28, and optical disk drive 30 are connected to the system bus 23 by a hard disk drive interface 32, a magnetic disk drive interface 33, and an optical drive interface 34, respectively. The drives and their associated computer-readable media provide nonvolatile storage for the personal computer 20. Although the description of computer-readable media above refers to a hard disk, a removable magnetic disk and a CD-ROM disk, it should be appreciated by those skilled in the art that other types of media that are readable by a computer, such as magnetic cassettes, flash memory cards, digital video disks, Bernoulli cartridges, and the like, may also be used in the exemplary operating environment.

A number of program modules may be stored in the drives and RAM 25, including an operating system 35, one or more application programs 36, other program modules 37, and program data 38. In particular, one of the other program modules 37 is an NLIR system 100 that includes certain embodiments of the invention, which are described below with reference to FIGS. 2 through 9. Other input devices (not shown) may include a microphone, joystick, game pad, satellite dish, scanner, or the like. These and other input devices are often connected to the processing units 21a–n through a serial port interface 46 that is coupled to the system bus, but may be connected by other interfaces, such as a game port or a universal serial bus (USB). A monitor 47 or other type of display device is also connected to the system bus 23 via an interface, such as a video adapter 48. In addition to the monitor, personal computers typically include other peripheral output devices (not shown), such as speakers. or printers.

The personal computer 20 may operate in a networked environment using logical connections to one or more remote computers, such as a remote computer 49. The remote computer 49 may be a server, a router, a peer device or other common network node, and typically includes many or all of the elements described relative to the personal computer 20, although only a memory storage device 50 has been illustrated in FIG. 1. The logical connections depicted in FIG. 1 include a local area network (LAN) 51 and a wide area network (WAN) 52. Such networking environments are commonplace in offices, enterprise-wide computer networks, intranets and the Internet.

When used in a LAN networking environment, the personal computer 20 is connected to the LAN 51 through a network interface 53. When used in a WAN networking environment, the personal computer 20 typically includes a modem 54 or other means for establishing communications over the WAN 52, such as the Internet. The modem 54, which may be internal or external, is connected to the system bus 23 via the serial port interface 46. In a networked environment, program modules depicted relative to the personal computer 20, or portions thereof, may be stored in the remote memory storage device. It will be appreciated that the network connections shown are exemplary and other means of establishing a communications link between the computers may be used.

Exemplary embodiments of the present invention are or will be incorporated into the ENCARTA '99 application program sold by Microsoft Corporation on CD-ROM for use with personal computer systems such as the illustrative personal computer 20. It will be appreciated that the principles of the invention are not limited to any particular software programs, but could equivalently be applied to any computer-implemented system that involves the use of natural language information retrieval. For example, the principles of the invention could be applied to searching tools used for electronic databases, networks, or the Internet. In addition, it is anticipated that the invention may be deployed in connection with future versions of Microsoft's computer software programs. It will be further appreciated that the invention could equivalently be implemented on host computers other than personal computers, and could equivalently be transmitted to the host computer by means other than a CD-ROM, for example, by way of the network connection interface 53.

Notwithstanding the broad applicability of the principles of the invention described above, it should be understood that the configuration of the exemplary embodiment as an application program for widely-used personal computers provides significant advantages. In particular, the NLIR system 100 described in this specification is specifically designed to exhibit acceptable memory-use and performance characteristics when implemented on the conventional multi-processor personal computer system 20. In so configuring the NLIR system 100, certain trade-off balances, particularly between the often conflicting goals of minimizing memory storage, increasing performance speed and increasing searching precision, have necessarily been struck. It should be understood that variations of the trade-off balances struck in the exemplary embodiments described in this specification are within the spirit and scope of the present invention, particularly in view of the fact that inevitable improvements in computer hardware and memory storage devices will make other trade-off balances feasible.

The Natural Language Information Retrieval Utility

Figure 2:
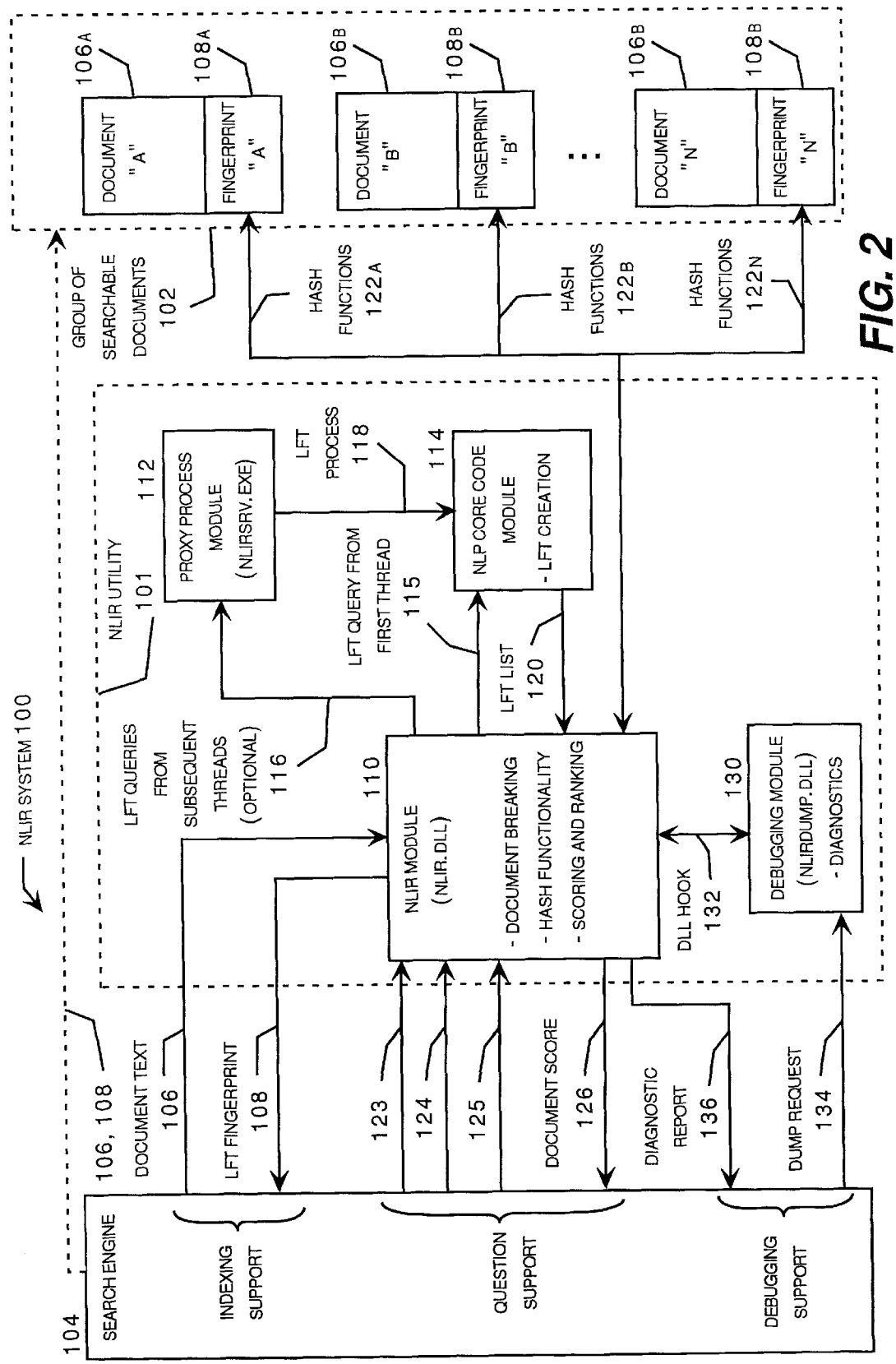
FIG. 2 is a functional block diagram that illustrates a natural language information retrieval utility that operates in cooperation with a search engine and a group of searchable documents.

FIG. 2 is a functional block diagram that illustrates the NLIR system 100 including an NLIR utility 101 that operates in cooperation with a group of searchable documents 102 and a search engine 104. As noted previously, the NLIR system 100 typically includes three modes of operation. First, during index processing, the NLIR system 100 creates a group of searchable documents 102 by preparing documents, represented by the documents 106a–n, for NLP searching. Second, during question processing, the NLIR system 100 receives a natural language question and, for one or more document in the group of searchable documents, computes a document score connoting the likelihood that the document includes an answer to the natural language question. Third, during debugging, the NLIR system 100 receives trouble-shooting requests and returns diagnostic reports, such as a document trace report or a question trace report.

During index processing, the search engine 104 passes a text-containing document 106 to the NLIR utility 101, which returns a hash-table fingerprint 108 to the search engine 104. The hash-table fingerprint 108, which is opaque to the search engine 104, contains a highly compressed representation of LFTs contained within the document 106. The search engine 104 may pass additional documents to the NLIR utility 101 for index processing to create and add to the group of searchable documents 102, which is represented by documents 106a–n having associated hash-table fingerprints 108a–n. Thus, the search engine 104 selects documents for index processing, and the NLIR utility 101 provides the search engine with a tool for making the selected documents amenable to NLIR processing.

More specifically, the search engine 104 passes a representative text-containing document 106 to an NLIR module 110, which cooperates with a proxy process module 112 and an NLP core code module 114 to create the corresponding hash-table fingerprint 108. The NLP core code module 114 relies heavily on the use of global variables and, for this reason, cannot run multiple threads simultaneously. Therefore, if multiple LFT queries were configured as multiple threads, the NLP core code module 114 would not be able to run multiple LFT queries on multiple processing units 21a–n simultaneously. This limitation would undermine much of the advantage of running the NLIR system 100 on the multi-processor computer system 20.

To overcome this potential limitation, the proxy process module 112 coverts multiple threads calling the NLP core code module 114 simultaneously into independent processes so that the NLP core code module 114 can process multiple LFTs on the multiple processors 21a–n. Accordingly, the NLIR module 110 receives the document 106 and parses the document into sentences. If the NLP core code module 114 is not currently processing an active client thread, the NLIR module 110 passes the LFT query 115 directly to the NLP core code module 114. On the other hand, if the NLP core code module 114 is already processing an active client thread, the NLIR module 110 passes the LFT query 116 to the proxy process module 112. The proxy process module 112 passes the sentences one at a time to the NLP core code module 114 in the context of a process for the calling client thread.

Thus, the NLP core code module 114 may receive sentence to process directly from the NLIR module 110 (i.e., LFT query 115 for the first active client thread), or by way of the proxy process module 112 (i.e., LFT query 116 for additional simultaneous client threads). In both cases, the NLP core code module 114 then identifies one or more LFTs for the LFT query, and returns an LFT list 120 to the NLIR module 110. The proxy process module 112 thus allows the NLP core code module 114 to process multiple LFT processes on the multiple processors 21a–n.

The NLIR module 110 obtains LFTs for each sentence of the representative document 106 in the manner described above. The NLIR module 110 then engages in hash operations 122 to create the hash-table fingerprint 108, which represents each LFT as a pseudo-random number. Specifically, the NLIR module 110 allocates a 19-bit array having a size "N" that is equal to 110% times the number "M" of LFTs for the document. The NLIR module 110 then populates the array using the ISO 3309 CRC algorithm to compute a 32-bit hash value corresponding to the literal string forming each LFT. The upper 16 bits of each hash value are used to determine an array entry point or array index, and the lower 19 bits are used as a "signature hash" that is stored within the array. If the array entry corresponding to the array entry point is not empty (i.e., contains a previously-assigned signature hash), the NLIR module 110 increments the array index until an empty array entry is located. The NLIR module 110 then stores the signature hash for the LFT in that array entry.

Compactly storing odd-sized values in arrays is not something that computer languages like "C" typically support. Those skilled in the art will appreciate that a 19-bit array is constructed by declaring a sufficiently large array of 32-bit machine words, which languages like "C" typically support. The first 19 bit value goes into the first 19 bits of the first machine word. The next 19 bits are split, with 13 digits stored in the next 13 bits of the first machine word, and the remaining six digits going into the second machine word. The next 19 digits fit entirely into the second machine word. The next 19 digits are split, with seven going into the second machine word, and the other 12 digits going into the third machine word, and so forth.

During question support, the search engine 104 passes the natural language question to the NLIR module 110 in a begin-question command 123. The NLIR module 110 allocates memory to hold LFTs for the question and obtains the LFTs in the same manner that it obtained LFTs for a sentence of a document during index processing. That is, if the NLP core code module 114 is not already processing an active thread, the NLIR module 110 passes the question directly to the NLP core code module 114. On the other hand, if the NLP core code module 114 is already processing an active thread, the NLIR module 110 passes the question to the NLP core code module 114 by way of the proxy process module 112. In this case, the NLIR module 110 passes the question to the proxy process module 112 as an LFT query 116. The proxy process module 112 passes the LFT query 116 to the NLP core code module 114 in the context of an LFT process 118 for the calling thread.

Like sentences during index processing, the NLP core code module 114 may receive questions during question processing directly from the NLIR module 110 (i.e., LFT query 115 for the first active client thread), or by way of the proxy process module 112 (i.e., LFT query 116 for additional simultaneous client threads). In both cases, the NLP core code module 114 computes one or more LFTs for the question and returns an LFT list 120 to the NLIR module 110, which stores the question LFTs until the search engine 104 passes an end-question command 124 to the NLIR module.

While the NLIR module 110 maintains an LFT list 120 for a particular question, the search engine 104 may pass an LFT comparison requests 125 to the NLIR module. Each LFT comparison request 125 includes two "handles" that specify a current document and a current natural language question for LFT comparison. For each question LFT, the NLIR module 110 determines whether the current document contains a matching hash value. Specifically, the NLIR module 110 computes a hash value for the question LFT using the ISO 3309 CRC algorithm and uses the upper 16 bits of the hash value as an index hash and the lower 19 bits of the hash value as a signature hash. The NLIR module 110 then determines whether the hash-table fingerprint for the current document includes the signature hash at an array index corresponding to the index hash. The NLIR module 110 follows this procedure to identify zero or more matches between the question LFTs and the hash-table fingerprint for the current document.

The NLIR module 110 then looks up a score for each matching LFT and sums the scores for the matching LFT to compute a document score 126, which is returned to the search engine 104. The search engine may then submit another LFT comparison request to the NLIR module 110, typically repeating this processes until a document score has been obtained for each document in the group of searchable documents 102. The search engine 104 then ranks the documents according to their respective document scores and displays a list of the highest-ranking documents to the user as a list of documents that likely contain an answer to the natural language query.

During debugging support, a debugging module 130, which is typically not shipped with the NLIR system 100, is loaded on the host computer system 20. The debugging module 130 and the NLIR module 110 include a DLL hook 132 that allows these modules to communicate once the debugging module 130 is loaded on the host computer system 20. The search engine 104 transmits a dump request 134 to the debugging module 130, which runs the dump request through the NLIR module 110 and returns a diagnostic report 136. For example, the search engine 104 may submit document text along with a dump request 134, and the resulting diagnostic report will identify the LFTs identified for the document text. In addition, the search engine 104 may submit a natural language question along with a dump request 134, and the resulting diagnostic report will identify the logical form relationships identified for the question text.

Figure 3:
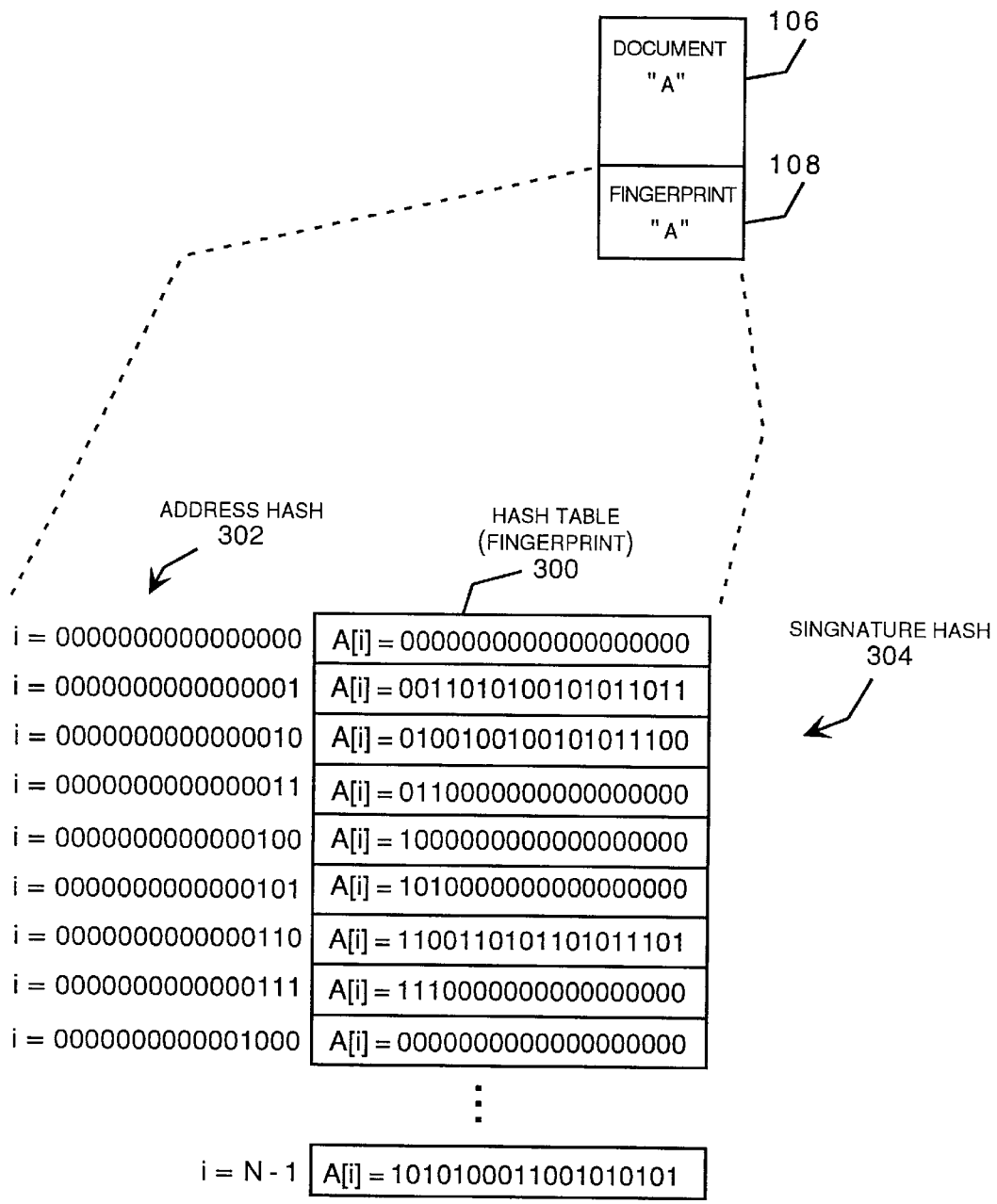
FIG. 3 is a functional block diagram that illustrates a document including a hash-table fingerprint that is created and searched by the natural language information retrieval utility.

FIG. 3 is a functional block diagram that illustrates a document including a hash-table fingerprint 300 that is created and searched by NLIR utility 101. The hash-table fingerprint 300 is typically an array of 19-bit values A(i) in which each value corresponds to a 16-bit array index (i). The hash-table fingerprint 300 includes "N" array entries, where "N" is equal to 110% times the number "M" of LFTs in the corresponding document. The hash-table fingerprint 300 stores representations of 32-bit hash values that may be computed using the ISO 3309 CRC algorithm. Specifically, the array index (i) corresponds to the address hash 302, which is the upper 16 bits of a hash value. The value stored within an array element correspond to a signature hash value, which in the lower 19 bits of the hash value.

As the address hash 302 is a 16-bit value, the maximum size of the hash-table fingerprint 300 is 65,536, which corresponds to a maximum number of LFTs for a document of approximately 59,578. The signature hash value, which is a 19-bit number, permits up to 524,288 different signature hash values. In the rare case in which 110% times the number of LFTs in a document exceeds 65,536, the entire 32-bit CRC is stored in a 32-bit array during index processing. This array is linearly searched on an LFT-by-LFT basis during question processing.

Figure 4A:
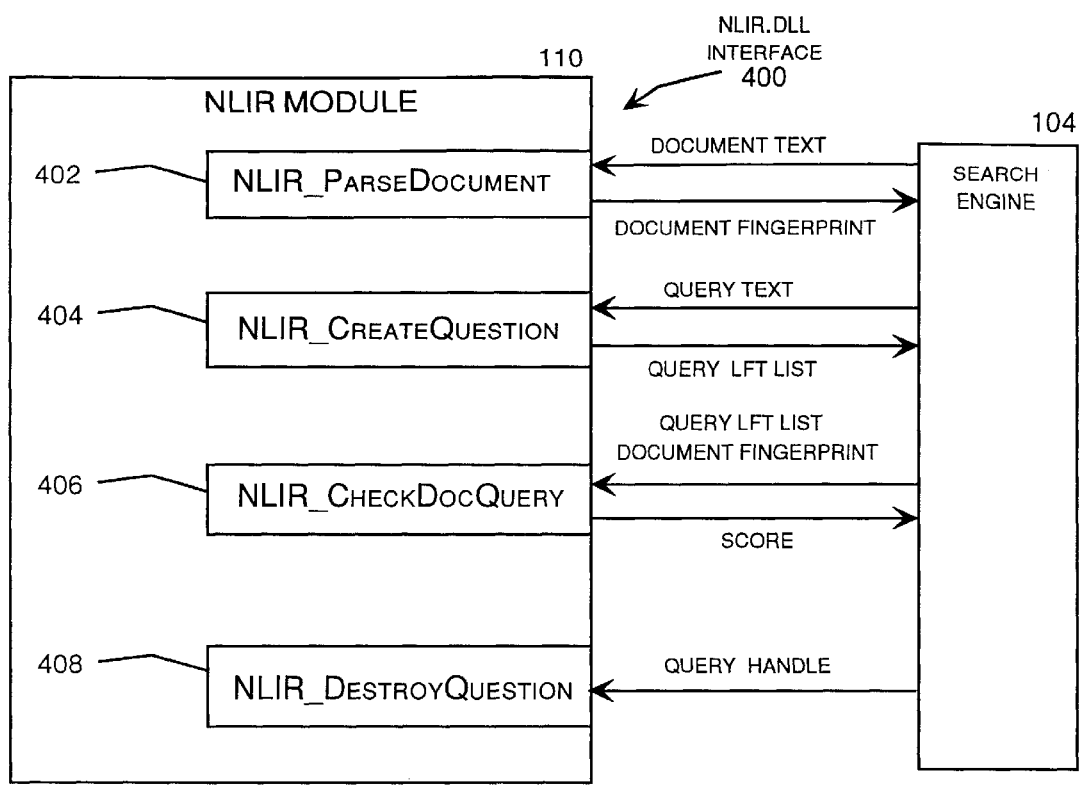
FIG. 4A is a functional block diagram that illustrates an interface for a natural language information retrieval module.

FIG. 4A is a functional block diagram that illustrates an NLIR.DLL interface 400 for the NLIR module 110. The NLIR.DLL interface 400 includes an NLIR_ParseDocument interface method 402 that the search engine 104 calls to obtain a hash-table fingerprint for a document. The NLIR_ParseDocument interface method 402 returns the hash-table fingerprint, which is opaque to the search engine 104. Because the LFTs are represented by opaque entries in a hash table, the LFTs as represented in the hash table cannot be viewed directly. The debugging module 130 allows a user activate and deactivate trace functions that cause the NLIR module 110 to generate the actual LFTs for analysis. The debugging module 130 is described in greater detail below with reference to FIG. 4B.

The NLIR.DLL interface 400 also includes an NLIR_CreateQuestion interface method 404 that the search engine 104 calls to transmit a begin-question command to the NLIR module 110. The search engine 104 passes a natural language question to the NLIR module 110 when calling the NLIR_CreateQuestion interface method 404, which returns an LFT list for the question. Upon receiving the NLIR_CreateQuestion call, the NLIR module 110 allocates memory to the question for storing the LFT list for the question.

The NLIR.DLL interface 400 also includes an NLIR_CheckDocQuery interface method 406 that the search engine 104 calls to transmit an LFT comparison request to the NLIR module 110. The search engine 104 passes handles identifying a natural language question and a document to the NLIR module 110 when calling the NLIR_CheckDocQuery interface method 406, which returns a document score connoting a likelihood that the specified document contains an answer to the specified question.

The NLIR.DLL interface 400 also includes an NLIR_DestroyQuestion interface method 408 that the search engine 104 calls to transmit an end-question command to the NLIR module 110. The search engine 104 passes a handle identifying a natural language question when calling the NLIR_DestroyQuestion interface method 408. Upon receiving the NLIR_DestroyQuestion call, the NLIR module 110 deallocates or frees the memory that stores the LFT list for the specified question.

Figure 4B:
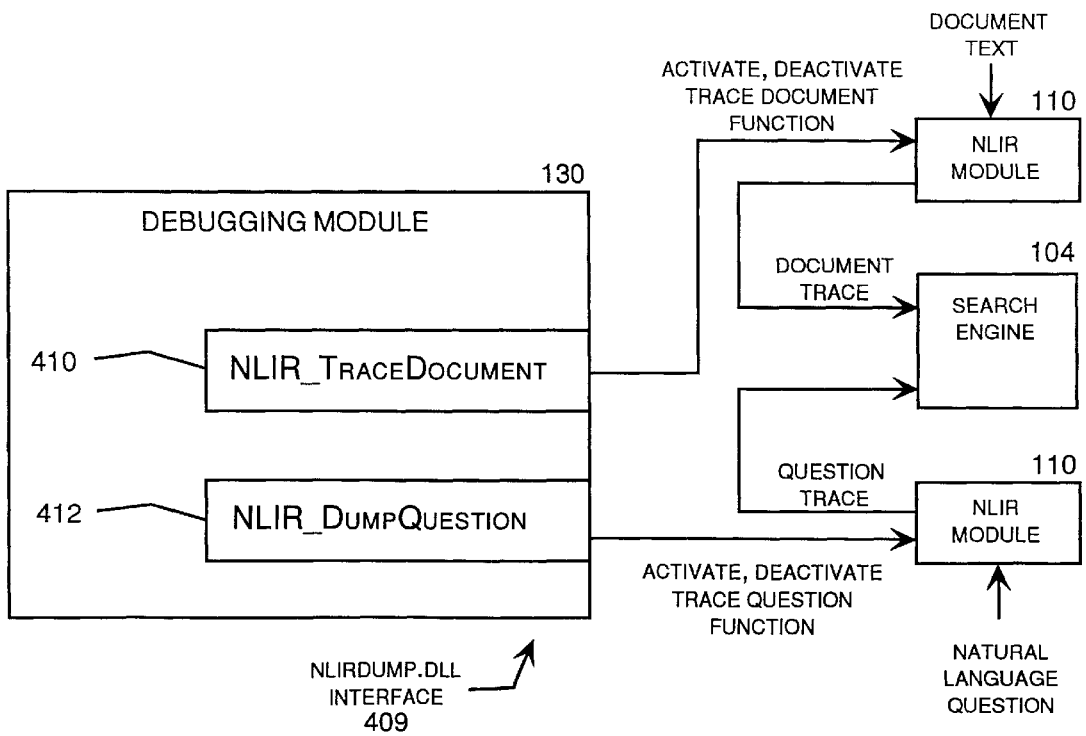
FIG. 4B is a functional block diagram that illustrates an interface for a debugging module that cooperates with the natural language information retrieval module shown in FIG. 4A.

FIG. 4B is a functional block diagram that illustrates an NLIRDUMP.DLL interface 409 for the debugging module 130. The NLIRDUMP.DLL interface 409 includes an NLIR_TraceDocument interface method 410 that the search engine 104 calls to activate and deactivate a trace document function that resides within the NLIR module 110. When the trace document function is active, it causes the NLIR module 110 to identify the logical form relationships identified for document text processed by the NLIR module. The NLIRDUMP.DLL interface 409 also includes an NLIR_DumpQuestion interface method 412 that the search engine 104 calls to activate and deactivate a trace question function that resides within the NLIR module 110. When the trace question function is active, it causes the NLIR module 110 to identify the logical form relationships identified for questions processed by the NLIR module.

Figure 5:
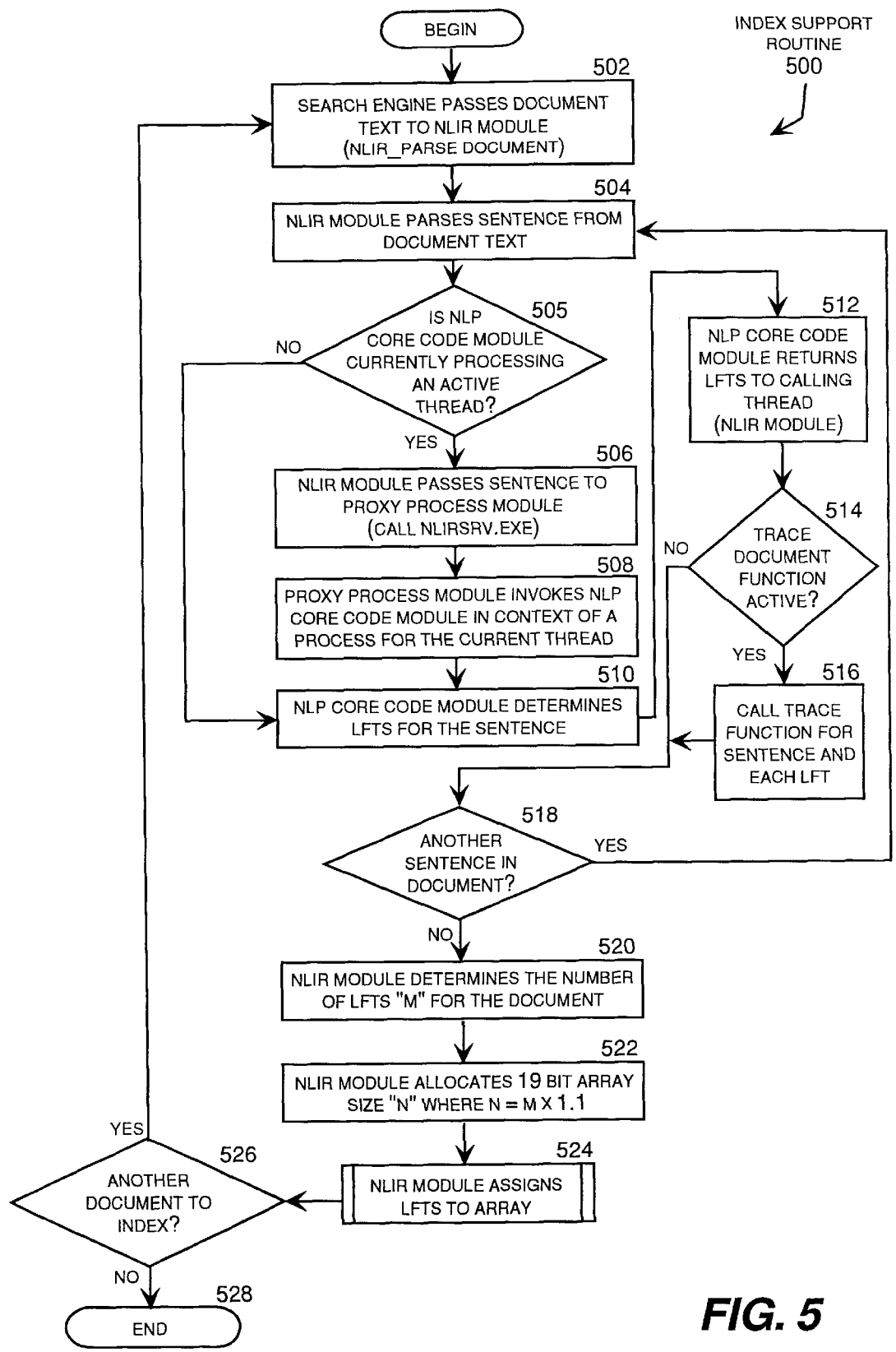
FIG. 5 is a logic flow diagram that illustrates an index support routine for the natural language information retrieval system shown in FIG. 4A.

FIG. 5 is a logic flow diagram that illustrates an index support routine 500, in which the search engine 104 accesses the NLIR module 110 to add one or more documents to the group of searchable documents 102. In step 502, the search utility 104 passes a text-containing document to the NLIR module 110, typically by calling the NLIR_ParseDocument method 402. Step 502 is followed by step 504, in which the NLIR module 110 parses a sentence from the document. Step 504 is followed by step 505, in which the NLIR module 110 determines whether the NLP core code module 114 is already processing an active thread (i.e., whether the calling thread is not the first active thread to call the NLIR module 110).

If the NLP core code module 114 is already processing an active thread, the "YES" branch is followed to step 506, in which the NLIR module 110 passes the sentence to the proxy process module 112, typically by calling the proxy process executable routine (NLIRSRV.EXE). Step 506 is followed by step 508, in which the proxy process module 112 invokes the NLP core code module 114 in the context of a process for the calling thread. That is, if a process already exists for the calling thread, the proxy process module 112 invokes the NLP core code module 114 in connection with the preexisting process for the calling thread. On the other hand, if a process does not already exist for the calling thread, the proxy process module 112 invokes the NLP core code module 114 as a new process for the calling thread. Step 508 is followed by step 510, in which the NLP core code module 114 determines one or more LFTs for the sentence.

Referring again to step 505, if the NLP core code module 114 is not already processing an active thread, the "NO" branch loops to step 510, in which the NLIR module 110 calls the NLP core code module 114. That is, NLIR module 110 passes sentences directly to the NLP core code module 114 for the first active client thread, and passes sentences to the NLP core code module 114 by way of the proxy process module 112 for the threads other than the first active client thread. This allows the proxy process module 112 to pass sentences to the NLP core code module 114 for threads other than the first active client thread in the context of a separate process for each client thread. This, in turn, allows the NLP core code module 114 to operate in separate processes running simultaneously on multiple processing units.

Step 510 is followed by step 512, in which the NLP core code module 114 returns LFTs for the sentence to the calling thread (i.e., to the NLIR module 110). Step 512 is followed by decision step 514, in which the NLIR module 110 determines whether the trace document function is active. The NLIR_TraceDocument method 410 of the debugging module 130 may be accessed to activate and deactivate the trace document function. If the trace document function is active, the "YES" branch is followed to step 516, in which the NLIR module 110 calls the trace document function for the sentence and for each LFT associated with the sentence to generate a trace document diagnostic report.

Step 516 and the "NO" branch from step 514 are followed by step 518, in which the NLIR module 110 determines whether the document contains another sentence. If the document does include another sentence, the "YES" branch loops from step 518 to step 504, in which the NLIR module 110 parses another sentence from the document. If the document does not include another sentence, the "NO" branch is followed from step 518 to step 520, in which the NLIR module 110 determines the number of LFTs "M" for the document. Step 520 is followed by step 522, in which the NLIR module 110 allocates an array having "N" 19-bit entries, where "N" is equal to "M" times 110%. Step 522 is followed by routine 524, in which the NLIR module 110 creates a hash-table fingerprint for the document by assigning the LFTs for the document to the array. Following routine 524, the document is a member of the group of searchable documents 102 that may be accessed by the NLIR utility 101 during subsequent question processing. Routine 524 is described in greater detail with reference to FIG. 6.

Routine 524 is followed by decision step 526, in which the search engine 104 determines whether to index another document. If the search engine 104 elects to index another document, the "YES" branch loops from step 526 to step 502, in which the search engine 104 passes another document to the NLIR module 110. If the search engine 104 does not elect to index another document, the "NO" branch is followed from step 526 to the "END" step 528. Thus, routine 500 allows the search engine 104 to access the NLIR utility 110 to add additional documents to the group of searchable documents 102 at the discretion of the search engine 104.

Figure 6:
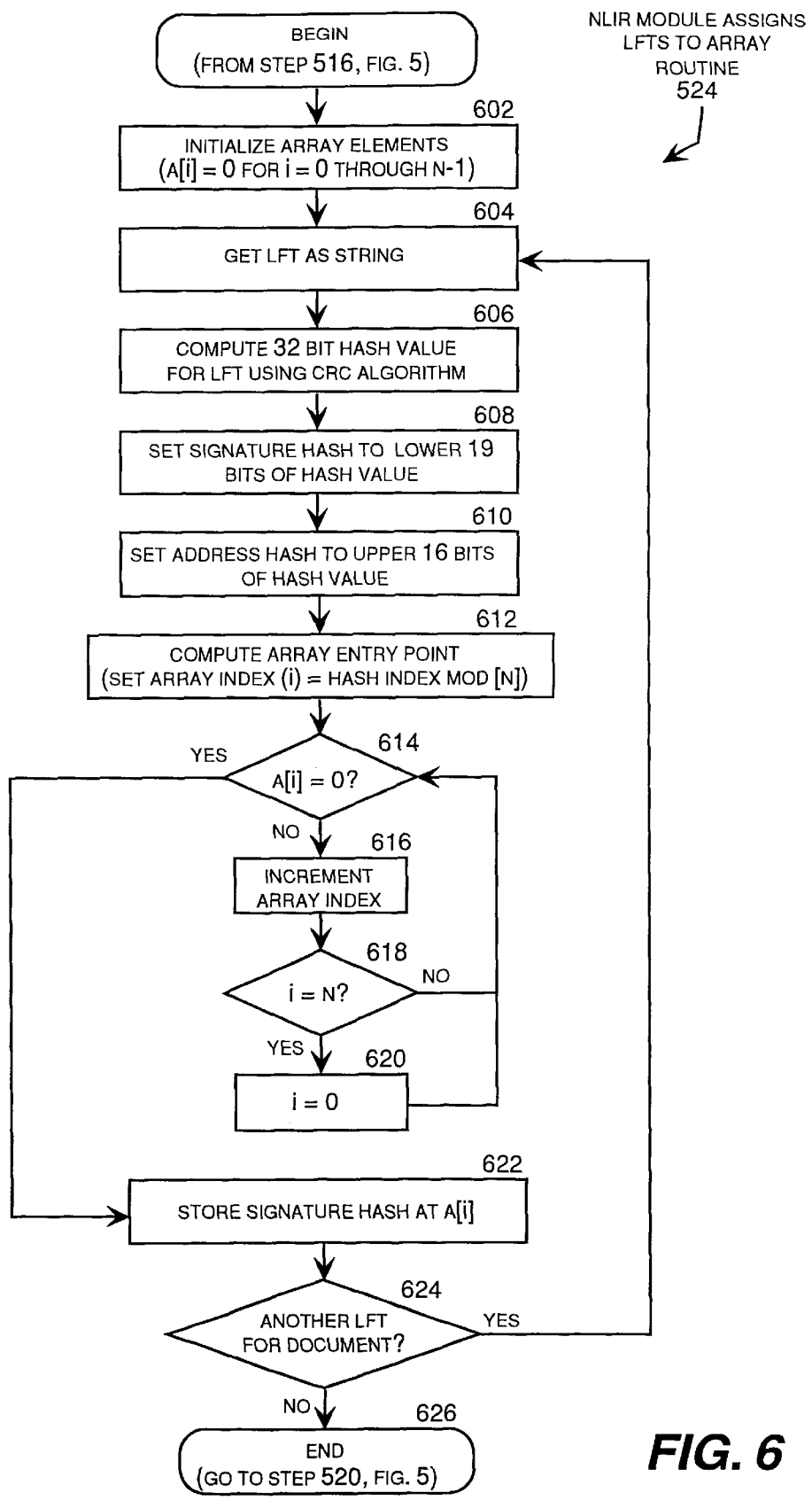
FIG. 6 is a logic flow diagram that illustrates a routine in which a natural language information retrieval module assigns logical-form triples to an array.

FIG. 6 is a logic flow diagram that illustrates routine 524, in which the NLIR module 110 assigns "M" LFTs for a current document, which were identified by the NLP core code module 114, to the array of size "N" (N=M×110%) to create a hash-table fingerprint for the current document. Routine 524 begins following step 522, shown in FIG. 5. In step 602, the NLIR module 110 initializes the elements of the array (i.e., sets A[i]=0 for i=0 through N−1). Step 602 is followed by step 604, in which the NLIR module 110 gets one of the LFTs for the current document in a text string format. Step 604 is followed by step 606, in which the NLIR module 110 computes a hash value for the LFT, typically by applying the CRC algorithm defined by ISO 3309 to the LFT text string. In other words, the NLIR module 110 computes a 32-bit hash value, which is a pseudo-random number corresponding to the LFT text string.

Step 606 is followed by step 608, in which the NLIR module 110 parses the hash value by setting a signature hash for the LFT to the lower 19 bits of the hash value. Step 608 is followed by step 610, in which the NLIR module 110 sets an address hash for the LFT to the upper 16 bits of the hash value. Step 610 is followed by step 612, in which the NLIR module 110 computes an array entry point for the LFT based on the address hash. Specifically, the array entry point may be computed as the remainder of the number of elements in the array "N" divided by the address hash (i.e., array entry point=address hash mod (n)). The purpose of this calculation is to convert the 16-bit address hash into a pseudo-random number having a value between zero and N−1, which causes the array entry point (array index=i) to correspond to the index value for one of the array elements.

Step 612 is followed by step 614, in which the NLIR module 110 determines whether the value (A[i]) stored at the array entry point (array index=i) is equal to zero, indicating that a hash value has not yet been stored at that particular array element. If the value (A[i]) stored at the array entry point (array index=i) is equal to zero, indicating that a hash value has not yet been stored at that particular array element, the "YES" branch jumps to step 622, which is described below. On the other hand, if the value (A[i]) stored at the array entry point (array index=i) is not equal to zero, indicating that a hash value has already been stored at that particular array element, the NLIR module 110 increments the array index (i.e., array index=i+1). Step 616 is followed by step 618, in which the NLIR module 110 determines whether the newly-computed array index is larger than the largest index value in the array (i.e., array index=N).

If the newly-computed array index is larger than the largest index value in the array (i.e., i=N), the "YES" branch is followed from step 618 to step 620, in which the NLIR module 110 sets the array index to zero (i.e., the array index loops from the bottom to the top of the array). From step 620 and the "NO" branch from step 618, routine 518 loops to step 614, in which the NLIR module 110 checks whether the value stored at the new array index is equal to zero. Because the number "N" of elements in the array is larger than the number "M" of LFTs for the current document, the NLIR module 110 will eventually loop through the steps 614 through 620 until it locates an empty (i.e., A[i]=0) array element. Once the NLIR module 110 identifies an empty array element, the "YES" branch jumps from step 614 to step 622, in which the NLIR module 110 stores the signature hash for the current LFT in the empty array element.

Step 622 is followed by step 624, in which the NLIR module 110 determines whether there is another LFT for the current document to assign to the array. If there is another LFT for the current document, the "YES" branch loops from step 624 to step 604, in which the NLIR module 110 gets another LFT. If there is not another LFT for the current document, the "NO" branch is followed from step 624 to the "END" step 626, which returns to step 526 shown on FIG. 5. Routine 518 thus allows the NLIR module 110 to assign each LFT for the current document to the array to create a hash-table fingerprint for the current document.

Figure 7:
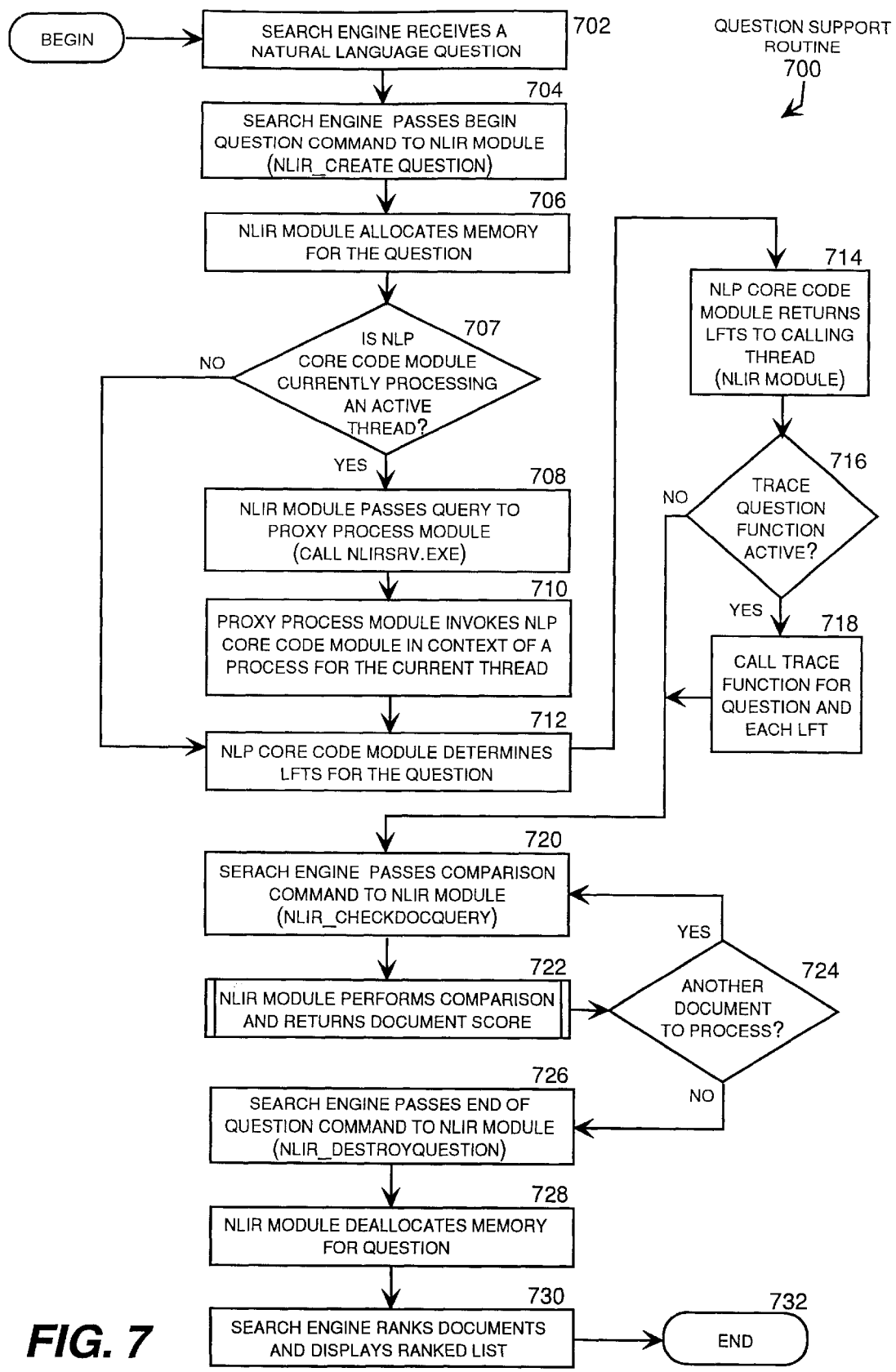
FIG. 7 is a logic flow diagram that illustrates a question support routine for the natural language information retrieval system shown in FIG. 4A.

FIG. 7 is a logic flow diagram that illustrates a question support routine 700 for the NLIR system 100. In step 702, the search engine 104 receives a natural language question. Step 702 is followed by step 704, in which the search engine 104 passes the question to the NLIR module 110 in a begin-question command, typically by calling the NLIR_CreateQuestion interface method 404. Step 704 is followed by step 706, in which the NLIR module 110 allocates memory for the question. The NLIR module 110 uses this memory to store LFTs for the question. Step 706 is followed by step 707, in which the NLIR module 110 determines whether the NLP core code module 114 is already processing an active thread.

If the NLP core code module 114 is already processing an active thread, the "YES" branch is followed to step 708, in which the NLIR module 110 passes the question to the proxy process module 112, typically by calling the proxy process executable routine (NLIRSRV.EXE). Step 708 is followed by step 710, in which the proxy process module 112 invokes the NLP core code module 114 as a new process for the calling thread. That is, if a process already exists for the calling thread, the proxy process module 112 invokes the NLP core code module 114 in connection with the preexisting process for the calling thread. On the other hand, if a process does not already exist for the calling thread, the proxy process module 112 invokes the NLP core code module 114 as a new process for the calling thread. Step 710 is followed by step 712, in which the NLP core code module 114 determines one or more LFTs for the question.

Referring again to step 707, if the NLP core code module 114 is not already processing an active thread, the "YES" branch loops to step 712, in which the NLIR module 110 calls the NLP core code module 114. That is, NLIR module 110 passes questions directly to the NLP core code module 114 for the first active client thread, and passes questions to the NLP core code module 114 by way of the proxy process module 112 for the threads other than the first client thread. This allows the proxy process module 112 to pass sentences to the NLP core code module 114 for threads other than the first client thread in the context of a separate process for reach client thread. This, in turn, allows the NLP core code module 114 to operate in separate processes running simultaneously on multiple processing units.

Step 712 is followed by step 714, in which the NLP core code module 114 returns LFTs for the question to the calling thread (i.e., to the NLIR module 110). Step 714 is followed by decision step 716, in which the NLIR module 110 determines whether the trace question function is active. The NLIR_DumpQuestion method 412 of the debugging module 130 may be accessed to activate and deactivate the trace question function. If the trace question function is active, the "YES" branch is followed to step 718, in which the NLIR module 110 calls the trace question function for the sentence and for each LFT associated with the question to generate a trace document diagnostic report.

Once the NLIR module 110 has obtained the LFTs for the question, it is ready to compare these question LFTs to the document LFTs represented by the hash-table fingerprints 108a–n for the documents in the group of searchable 102. Thus, step 718 and the "NO" branch from step 716 are followed by step 720, in which the search engine 104 passes a comparison command to the NLIR module 110, typically by calling the NLIR_CheckDocQuery interface method 406. The search engine 104 specifies a particular document and a particular question to compare when calling the NLIR_CheckDocQuery interface method 406. Step 720 is followed by routine 722, in which the NLIR module 110 compares the LFTs for the question to the LFTs for the specified document. Also in routine 722, the NLIR module 110 computes a document score based on the comparison and returns the document score to the search engine 104. Routine 722 is described in greater detail with reference to FIG. 8.

Routine 722 is followed by step 724, in which the search engine 104 determines whether to process another document. If the search engine 104 elects to process another document, the "YES" branch loops from step 724 to step 720, in which the search engine passes another comparison command to the NLIR module 110. For example, the search engine 104 typically loops through steps 720–724 until a document score has been obtained for one or more documents in the group of searchable document 102, which the search engine 104 selected for NLIR processing.

If the search engine 104 does not elect to process another document, the "NO" is followed from step 724 to step 726, in which the search engine passes an end-question command, typically by calling the NLIR_DestroyQuestion interface method 408. Step 726 is followed by routine 728, in which the NLIR module 110 deallocates the memory that was allocated for the question in step 706. Step 728 is followed by step 730, in which the search engine 104 ranks the documents processed for the question in accordance with the document scores computed by the NLIR module 110 and displays the ranked list on the display device. Step 730 is followed by the "END" step 732.

Figure 8:
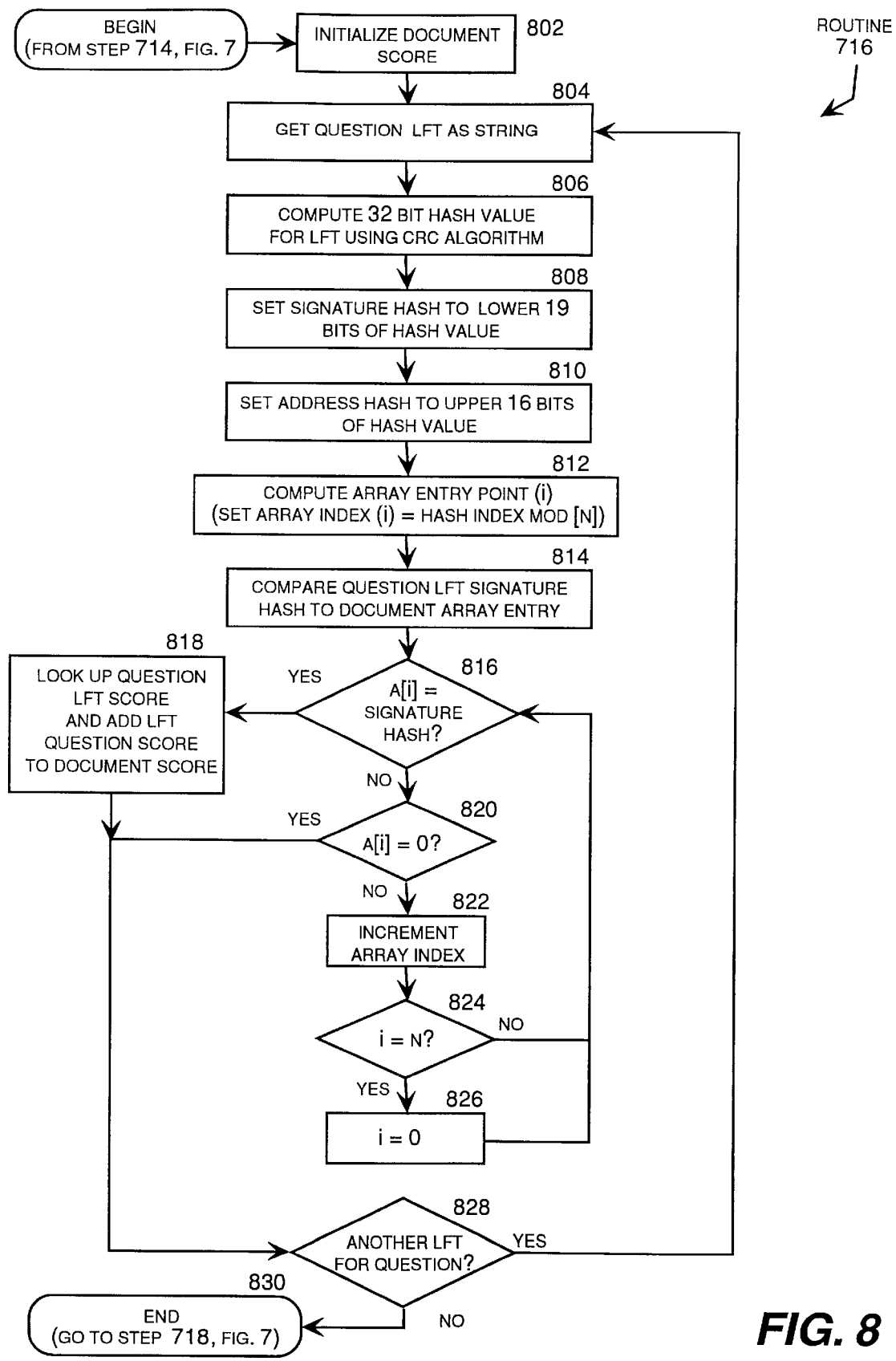
FIG. 8 is a logic flow diagram that illustrates a routine in which a natural language information retrieval module computes a document score for a natural language question.

FIG. 8 is a logic flow diagram that illustrates routine 722, in which the NLIR module 110 computes a document score for the natural language question. Routine 722 begins following step 720 shown on FIG. 7. In step 802, the NLIR module 110 initializes (i.e., sets to zero) a document score for the current document. Step 802 is followed by step 804, in which the NLIR module 110 gets one of the document LFTs as a text string. Step 804 is followed by step 806, in which the NLIR module 110 computes a 32-bit hash value for the LFT using the same algorithm that was used to create the hash-table fingerprints 108a–n for the documents in the group of searchable documents 102. For example, the CRC routine defined by ISO 3309 may be used for both purposes.

Step 806 is followed by step 808, in which the NLIR module 110 parses the lower 19 bits of the hash value as a signature hash for the LFT. Step 808 is followed by step 810, in which the NLIR module 110 sets an address hash for the LFT to the upper 16 bits of the hash value. Step 810 is followed by step 812, in which the NLIR module 110 computes an array entry point for the LFT based on the address hash. Specifically, the array entry point may be computed as the remainder of the number of elements in array "N" divided by the address hash (i.e., array entry point=address hash mod (n)). The purpose. of this calculation is to convert the 16-bit address hash into a pseudo-random number having a value between zero and N−1, which causes the array entry point (array index=i) to correspond to the index value for one of the array elements. It should be noted that the procedure described above for steps 804–812 followed during question processing is identical to the procedure described in steps 604–612 followed during index processing.

Step 812 is followed by step 814, in which the NLIR module 110 compares the signature hash for the question LFT to the entry (A[i]) stored at the array entry point. Step 814 is followed by step 816, in which the NLIR module 110 determines whether there is an LFT match at the current array index (i), which is initially set to the array entry point. That is, in step 816, the NLIR module 110 determines whether the signature hash for the question LFT is the same as the entry (A[i]) stored at the current array index (i). If there is an LFT match at the current array index, the "YES" branch is followed to step 818, in which the NLIR module 110 looks up an LFT score for the current LFT and adds this LFT score to the document score for the current document. For example, the NLIR module 110 may look up one of the LFT scores shown in Table 1, above, based on the type of matching LFT.

On the other hand, if there is not an LFT match at the current array index, the "NO" branch is followed to step 820, in which the NLIR module 110 determines whether the array entry at the current array index is empty (i.e., A[i]=0). If the array entry at the current array index is not empty, the "NO" branch is followed from step 820 to step 822, in which the NLIR module 110 increments the array index. Step 822 is followed by step 824, in which the NLIR module 110 determines whether the newly-computed array index is outside the array (i.e., i=N). If the newly-computed array index is outside the array, the "YES" branch is followed to step 826, in which the NLIR module 110 sets the array index to zero (i.e., wraps from the bottom to the top of the array). Following step 826 and the "NO" branch from step 824, routine 716 loops to step 816, in which the NLIR module 110 determines whether there is a matching LFT at the newly-computed array index.

Referring again to step 818, if a matching LFT is identified, routine 716 jumps to step 828 after the LFT score has been added to the document score. And referring again to step 820, if an empty array entry is encountered indicating that the current document does not include a match for the current LFT, the "YES" branch jumps from step 820 to step 828, which ends the processing for the current LFT. Thus, the NLIR module 110 identifies the current LFT as a matching LFT if the current signature hash matches the data value stored at any of the consecutively-addressed data-containing memory locations beginning with the array entry point.

The NLIR module 110 determines in step 828 whether there is another question LFT to process. If the NLIR module 110 determines that there is another question LFT to process, the "YES" branch loops from step 828 to step 804, in which the NLIR module 110 gets the next question LFT. If the NLIR module 110 determines that there is not another question LFT to process, the "NO" branch is followed from step 828 to the "END" step 830, which returns to step 724 shown in FIG. 7.

Figure 9:
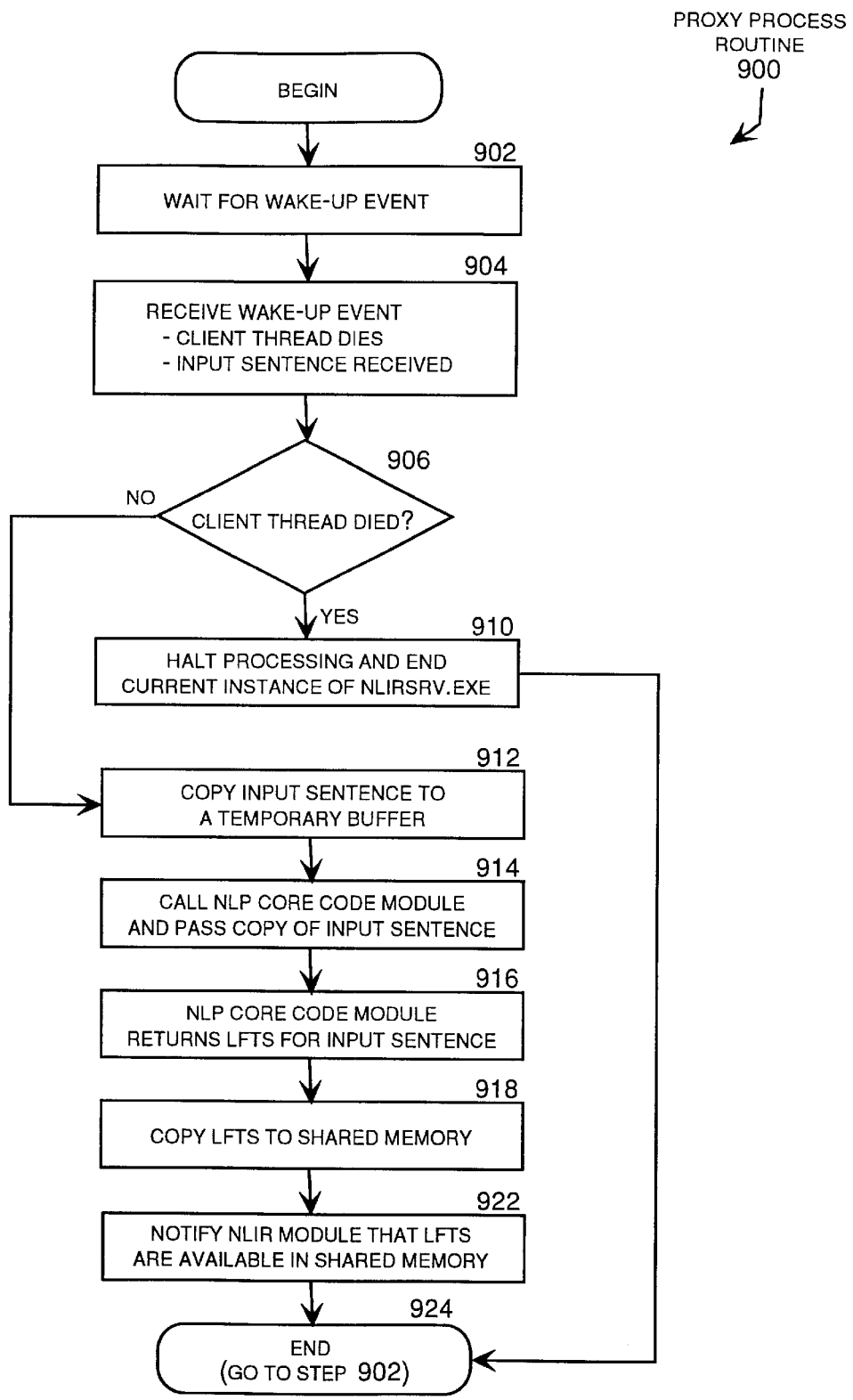
FIG. 9 is a logic flow diagram that illustrates a proxy process routine.

FIG. 9 is a logic flow diagram that illustrates a routine executed by the proxy process module 112. In step 902, the proxy process module 112 waits for a wake-up event. Step 902 is followed by step 904, in which the proxy process module 112 receives a wake-up event. This particular example illustrates two wake-up events, a notification that a client thread has died and receipt of an input sentence or question.

Step 902 is followed by step 904, in which the proxy process module 112 determines whether the wake-up event is a notification that a client thread has died. If the wake-up event is a notification that a client thread has died, the "YES" branch is followed to step 912, in which the proxy process module 112 halts processing for that client thread and ends the instance of NLIRSRV.EXE that is associated with that client thread. As a result, the proxy process module 112 will no longer pass sentences or questions to the NLP core code module 114 in connection with the thread that has just died.

If the wake-up event is not a notification that a client thread has died, the proxy process 112 has received an input sentence or question. In this case, the "NO" branch is followed from step 906 to step 912, in which the proxy process module 112 copies the input sentence or question to a temporary buffer. Step 912 is followed by step 914, in which the proxy process module 112 calls the NLP core code module 114 in the context of a process for the current sentence or question, and passes the current sentence or question to the NLP core code module.

Step 914 is followed by step 916, in which the NLP core code module 114 generates LFTs for the current sentence or question and returns the LFTs to the proxy process module 112. Step 916 is followed by step 918, in which the proxy process module 112 copies the LFTs to a memory that is shared with the NLIR module 110. Step 914 is followed by step 916, in which the proxy process module 112 notifies the NLIR module 110 that the LFTs for the current sentence or question are available in the shared memory. Step 922 is followed by the "END" step 924, which typically returns to step 902, in which the proxy process module 112 waits for another wake-up event.

In view of the foregoing, it will be appreciated that the invention provides an NLIR system exhibiting the combination of acceptable processing speed and acceptable memory requirements when implemented in connection with storage-limited program modules, such as a CD-ROM title. It should be understood that the foregoing relates only to the exemplary embodiments of the present invention, and that numerous changes may be made therein without departing from the spirit and scope of the invention as defined by the following claims.

The invention claimed is:

1. A method for creating a group of searchable documents comprising the steps of, for each of a plurality of documents:

receiving text defining the document;

parsing the text into a plurality of text portions;

obtaining one or more logical form relationships corresponding to each text portion;

defining an array having a size corresponding to the number of logical form relationships for the document;

creating a hash-table fingerprint for the document by, for each logical form relationship,
computing a hash value,
obtaining an address hash and a signature hash based on the corresponding hash value, and
storing the signature hash in the array at a memory location corresponding to the address hash;

parsing each hash value to obtain the corresponding address hash and signature hash;

identifying an array index for an array entry point corresponding to the address hash; and if the array entry point is empty, storing the signature hash at the array entry point.

2. The method of claim 1, further comprising the steps of, for each hash value:

if the array entry point is not empty, incrementing the array index of the array entry point until an empty memory location is defined; and storing the signature hash at the empty memory location.

3. The method of claim 2, wherein the step of identifying the array index for the array entry point comprises the step of setting the array index to the remainder of the address hash divided by the size of the array.

4. The method of claim 3, wherein the step of defining an array having a size corresponding to the number of logical form relationships for the document comprises the step of defining an array having a size that is a predetermined percentage larger than the number of logical form relationships for the document.

5. The method of claim 4, wherein:

the predetermined percentage is 110%;

the hash value is a 32-bit value;

the address hash is the upper 16 bits of the hash value; and the signature hash is the lower 16 bits of the hash value.

6. The method of claim 1, further comprising the steps of:

receiving a natural language question;

obtaining one or more logical form relationships for the question;

computing a hash value corresponding to each logical form relationship for the question; and for each document in the group of searchable documents, comparing each hash value corresponding to the logical form relationships for the question to the hash-table fingerprint for the document and identifying one or more matching hash values, obtaining a score for each matching hash value, and computing a document score connoting the likelihood that the document contains an answer to the question by summing the score for each matching hash value.

7. The method of claim 6, further comprising the steps of, for a current hash value for the question:

parsing the current hash value into a current address hash and a current signature hash;

identifying an array entry point in the array corresponding to the current address hash; and if the array entry point is not empty, identifying one or more consecutively-addressed data-containing memory locations beginning with the array entry point, comparing the current signature hash to the data value stored at each of the consecutively-addressed data-containing memory locations, and if the current signature hash matches the data value stored at any of the consecutively-addressed data-containing memory locations, identifying the current hash value as a matching hash value.

8. The method of claim 7, further comprising the steps of, for a current hash value for the question:

if the array entry point is empty, identifying the current hash value as a non-matching hash value; and if the current signature hash does not match the data value stored at any of the consecutively-addressed data-containing memory locations, identifying the current hash value as a non-matching hash value.

9. The method of claim 8, further comprising the steps of:

ranking the documents in order of their respective document scores; and displaying a list of highest-ranking documents as a suggestion list of documents containing an answer to the natural language question.

10. A computer-readable medium having computer-executable instructions comprising:

a natural language information retrieval module configured for:

creating a group of searchable documents by, for each document, receiving text defining the document from a search engine and returning a hash-table fingerprint comprising a representation of logical form relationships for the document to the search engine, and for each document, receiving a natural language question and the hash-table fingerprint comprising the representation of logical form relationship for the document from the search engine and returning a document score to the search engine connoting the likelihood that the document contains an answer to the natural language question;

the search engine configured for:

ranking the documents in order of their respective document scores, and displaying a list of highest-ranking documents as a suggestion list of documents containing an answer to the natural language question; and wherein the natural language information retrieval module defines an interface comprising:

a first interface method for receiving the text documents from the search engine and returning the hash-table fingerprints to the search engine; and a second interface method for receiving a current natural language question and a hash-table fingerprint for a current document from the search engine and returning a document score to the search engine connoting the likelihood that the current document contains an answer to the natural language question.

11. The computer-readable medium of claim 10, wherein the interface defined by the natural language information retrieval module further comprises:

a third interface method for initiating processing of the natural language question; and a forth interface method for terminating processing of the natural language question.

12. The computer-readable medium of claim 10, wherein the natural language information retrieval module is configured for parsing each document into a plurality of sentences, further comprising a proxy process module configured for:

receiving the sentences from one or more active client threads other than the first active client thread, each active client thread associated with the natural language information retrieval module;

creating a process for each client thread other than the first active client thread; and passing the sentences for each client thread other than the first active client thread to a natural language processing core code module in the context of an associated process, the natural language processing core code module configured to identify one or more logical form relationships corresponding to each sentence and return the logical form relationships to the natural language information retrieval module.

13. The computer-readable medium of claim 10, further comprising a debugging module defining an interface comprising:

a first interface method for activating and deactivating a trace document function that, when active, causes the natural language information retrieval module to identify the logical form relationships identified for document text processed by the natural language information retrieval module; and a second interface method for activating and deactivating a trace question function that, when active, causes the natural language information retrieval module to identify the logical form relationships identified for questions processed by the natural language information retrieval module.

14. A computer-readable medium having computer-executable instructions comprising:

a search engine;

a natural language information retrieval module configured for, receiving a text document from the search engine, and parsing the text document into a plurality of sentences;

a proxy process module configured for,
receiving the sentences from one or more active client threads associated with the natural language information retrieval module, and
creating a process for each client thread other than the first active client thread;

a natural language processing core code module configured for,
receiving the sentence from the natural language information retrieval module and from the proxy process module, and
for each sentence, identifying one or more logical form relationships corresponding to the sentence and returning the logical form relationships to the natural language information retrieval module; and wherein the natural language information retrieval module is further configured for:

defining an array having a size corresponding to the number of logical form relationships for the text document;

computing a hash value corresponding to each logical form relationship for the document;

obtaining an address hash and a signature hash for each logical form relationship based on the corresponding hash value; and for each logical form relationship, storing the signature hash in the array at a memory location corresponding to the address hash to construct a hash-table fingerprint for the text document.

15. The computer-readable medium of claim 14, wherein the natural language information retrieval module is further configured for:

parsing each hash value to obtain the corresponding address hash and signature hash;

identifying an array index for an array entry point corresponding to the address hash; and if the array entry point is empty, storing the signature hash at the array entry point.

16. The computer-readable medium of claim 15, wherein the natural language information retrieval module is further configured for identifying the array index for the array entry point by setting the array index to the remainder of the address hash divided by the size of the array.

17. The computer-readable medium of claim 16, wherein the natural language information retrieval module is further configured for:

determining for each hash value whether the array entry point is empty; and if the array entry point is not empty,
incrementing the array index of the array entry point until an empty memory location is defined, and
storing the signature hash at the empty memory location.

18. The computer-readable medium of claim 17, wherein the natural language information retrieval module is further configured for:

receiving a natural language question;

obtaining one or more logical form relationships for the question;

computing a hash value corresponding to each logical form relationship for the question; and for each text document in a group of searchable documents,
comparing the hash values corresponding to the logical form relationship for the question to the hash-table fingerprint for the text document and identifying one or more matching hash values,
obtaining a score for each matching hash value, and
computing a document score connoting the likelihood that the document contains an answer to the natural language question by summing the score for each matching hash value.

19. The computer-readable medium of claim 18, wherein the natural language information retrieval module is further configured for:

parsing a current hash value into a current address hash and a current signature hash;

identifying an array entry point in the array corresponding to the current address hash; and if the array entry point is not empty,
   identifying one or more consecutively-addressed data-containing memory locations beginning with the array entry point,
   comparing the current signature hash to the data value stored at each of the consecutively-addressed data-containing memory locations, and
   if the current signature hash matches the data value stored at any of the consecutively-addressed data-containing memory locations, identifying the current hash value as a matching hash value.

20. The computer-readable medium of claim 19, wherein the natural language information retrieval module is further configured for:
   if the array entry point is empty, identifying the current hash value as a non-matching hash value; and
   if the current signature hash does not match the data value stored at any of the consecutively-addressed data-containing memory locations, identifying the current hash value as a non-matching hash value.

21. A method for creating a group of searchable documents comprising the steps of, for each of a plurality of documents:
   receiving text defining the document;
   parsing the text into a plurality of text portions;
   obtaining one or more logical form relationships corresponding to each text portion;
   defining an array having a size corresponding to the number of logical form relationships for the documents; and creating a hash-table fingerprint for the document by, for each logical form relationship, computing a hash value,
      obtaining an address hash and a signature hash based on the corresponding hash value, and
      storing the signature hash in the array at a memory location corresponding to the address hash;
   receiving a natural language question;
   obtaining one or more logical form relationships for the question;
   computing a hash value corresponding to each logical form relationship for the question; and
   for each document in the group of searchable documents,
      comparing each hash value corresponding to the logical form relationships for the question to the hash-table fingerprint for the document and identifying one or more matching hash values,
      obtaining a score for each matching hash value, and
      computing a document score connoting the likelihood that the document contains an answer to the question by summing the score for each matching hash value.

22. The method of claim 21, further comprising the steps of, for a current hash value for the question:
   parsing the current hash value into a current address hash and a current signature hash;
   identifying an array entry point in the array corresponding to the current address hash; and
   if the array entry point is not empty,
      it identifying one or more consecutively-addressed data-containing memory locations beginning with the array entry point,
      comparing the current signature hash to the data value stored at each of the consecutively-addressed data-containing memory locations, and
      if the current signature hash matches the data value stored at any of the consecutively-addressed data-containing memory locations, identifying the current hash value as a matching hash value.

23. The method of claim 22, further comprising the steps of, for a current hash value for the question:
   if the array entry point is empty, identifying the current hash value as a non-matching hash value; and
   if the current signature hash does not match the data value stored at any of the consecutively-addressed data-containing memory locations, identifying the current hash value as a non-matching hash value.

24. The method of claim 23, further comprising the steps of:
   ranking the documents in order of their respective documents scores; and
   displaying a list of highest-ranking documents as a suggestion list of documents containing an answer to the natural language question.

25. A computer-readable medium having computer-executable instructions comprising:
   a natural language information retrieval module configured for:
      creating a group of searchable documents by, for each document, receiving text defining the document from a search engine and returning a hash-table fingerprint comprising a representation of logical form relationships for the document to the search engine, and
      for each document, receiving a natural language question and the hash-table fingerprint comprising the representation of logical form relationships for the document from the search engine and returning a document score to the search engine connoting the likelihood that the document contains an answer to the natural language question;
   the search engine configured for:
      ranking the documents in order of their respective document scores; and
      displaying a list of highest-ranking documents as a suggestion list of documents containing an answer to the natural language question; and
   wherein the natural language information retrieval module is further configured for parsing each document into a plurality of sentences and a proxy process module is configured for:
      receiving the sentences from one or more active client threads other than the first active client thread, each active client thread associated with the natural language information retrieval module;
      creating a process for each client thread other than the first active client thread; and
      passing the sentences for each client thread other than the first active client thread to a natural language processing core code module in the context of an associated process, the natural language processing core code module configured to identify one or more logical form relationships corresponding to each sentence and return the logical form relationships to the natural language information retrieval module.

26. A computer-readable medium having computer-executable instructions comprising:
   a natural language information retrieval module configured for:
      creating a group of searchable documents by, for each document, receiving text defining the document form a search engine and returning a hash-table fingerprint comprising a representation of logical form relationships for the document to the search engine, and for each document, receiving a natural language question and the hash-table fingerprint comprising the representation of logical form relationships for the document from the search engine and returning a document score to the search engine connoting the likelihood that the document contains an answer to the natural language question;

the search engine configured for:
ranking the documents in order of their respective document scores, and
displaying a list of highest-ranking documents as a suggestion list of documents containing an answer to the natural language question; and a debugging module defining an interface comprising:

a first interface method for activating and deactivating a trace document function that, when active, causes the natural language information retrieval module to identify the logical form relationships identified for document text processed by the natural language information retrieval module; and a second interface method for activating and deactivating a trace question function that, when active, causes the natural language information retrieval module to identify the logical form relationships identified for questions processed by the natural language information retrieval module.

\* \* \* \* \*